United States Patent
Yong

(10) Patent No.: US 11,542,730 B2
(45) Date of Patent: Jan. 3, 2023

(54) CLOSURE LATCH ASSEMBLY WITH A POWER RELEASE MECHANISM AND MOTOR CONTROL SYSTEM

(71) Applicant: Magna Closures (Kunshan) Co. Ltd., Kunshan (CN)

(72) Inventor: Hua Yong, ShangHai (CN)

(73) Assignee: MAGNA CLOSURES (KUNSHAN) CO. LTD., Kunshan (CN)

( * ) Notice: Subject to any disclaimer, the term of this patent is extended or adjusted under 35 U.S.C. 154(b) by 461 days.

(21) Appl. No.: 16/577,114

(22) Filed: Sep. 20, 2019

(65) Prior Publication Data

US 2020/0095809 A1 Mar. 26, 2020

Related U.S. Application Data

(60) Provisional application No. 62/733,884, filed on Sep. 20, 2018.

(51) Int. Cl.
 *E05B 81/62* (2014.01)
 *E05B 81/06* (2014.01)
 (Continued)

(52) U.S. Cl.
 CPC .............. *E05B 81/62* (2013.01); *E05B 77/36* (2013.01); *E05B 81/06* (2013.01); *E05B 81/16* (2013.01);
 (Continued)

(58) Field of Classification Search
 CPC ...... E05B 17/0029; E05B 81/00; E05B 81/04; E05B 81/06; E05B 81/16; E05B 81/62;
 (Continued)

(56) References Cited

U.S. PATENT DOCUMENTS 8,870,247 B2 * 10/2014 Yamagata ............... E05B 77/34
 292/201
9,512,652 B2 12/2016 Taurasi et al.
 (Continued)

FOREIGN PATENT DOCUMENTS

| CN | 108222711 A | 6/2018 |
| DE | 10157473 A1 | 5/2002 |
| JP | 2000104431 A | 4/2000 |

OTHER PUBLICATIONS

Chinese Search Report; CN Appl. No. 201910893608.4; dated Dec. 22, 2021; 7 pages.

*Primary Examiner* — Kristina R Fulton
*Assistant Examiner* — James E Ignaczewski
(74) *Attorney, Agent, or Firm* — Dickinson Wright PLLC

(57) ABSTRACT

A motor control system for a closure latch assembly is provided and includes a power release motor operatively coupled to a power release gear of the closure latch assembly. A plurality of relays are coupled between one of a first motor terminal and a second motor terminal and one of a voltage supply and an electrical ground to provide one of a first motor current flow to drive the power release motor in a first direction and a second motor current flow to drive the power release motor in a second direction. An electronic control unit is coupled to the plurality of relays and configured to command the plurality of relays to provide the first motor current flow in one of a power release mode and a release mode and the second motor current flow in one of a reset mode and an unlock mode.

18 Claims, 24 Drawing Sheets

(51) Int. Cl.
*E05B 81/16* (2014.01)
*H02P 7/03* (2016.01)
*H02K 7/07* (2006.01)
*H02K 7/116* (2006.01)
*E05B 77/36* (2014.01)

(52) U.S. Cl.
CPC ............ *H02K 7/07* (2013.01); *H02K 7/1166* (2013.01); *H02P 7/05* (2016.02)

(58) Field of Classification Search
CPC ..... H02P 7/03; H02P 7/05; H02P 7/20; H02K 7/07; H02K 7/1166
USPC .................................................. 292/201, 144
See application file for complete search history.

(56) References Cited

U.S. PATENT DOCUMENTS

| | | | |
|---|---|---|---|
| 10,655,368 B2* | 5/2020 | Frello | E05B 81/04 |
| 10,883,302 B2* | 1/2021 | Sugiyama | E05F 15/697 |
| 2016/0186468 A1* | 6/2016 | Ilea | E05B 81/14 |
| | | | 292/201 |
| 2018/0163439 A1* | 6/2018 | Patane | E05B 81/36 |
| 2018/0340359 A1 | 11/2018 | Cumbo | |
| 2018/0355643 A1 | 12/2018 | Taurasi | |

* cited by examiner

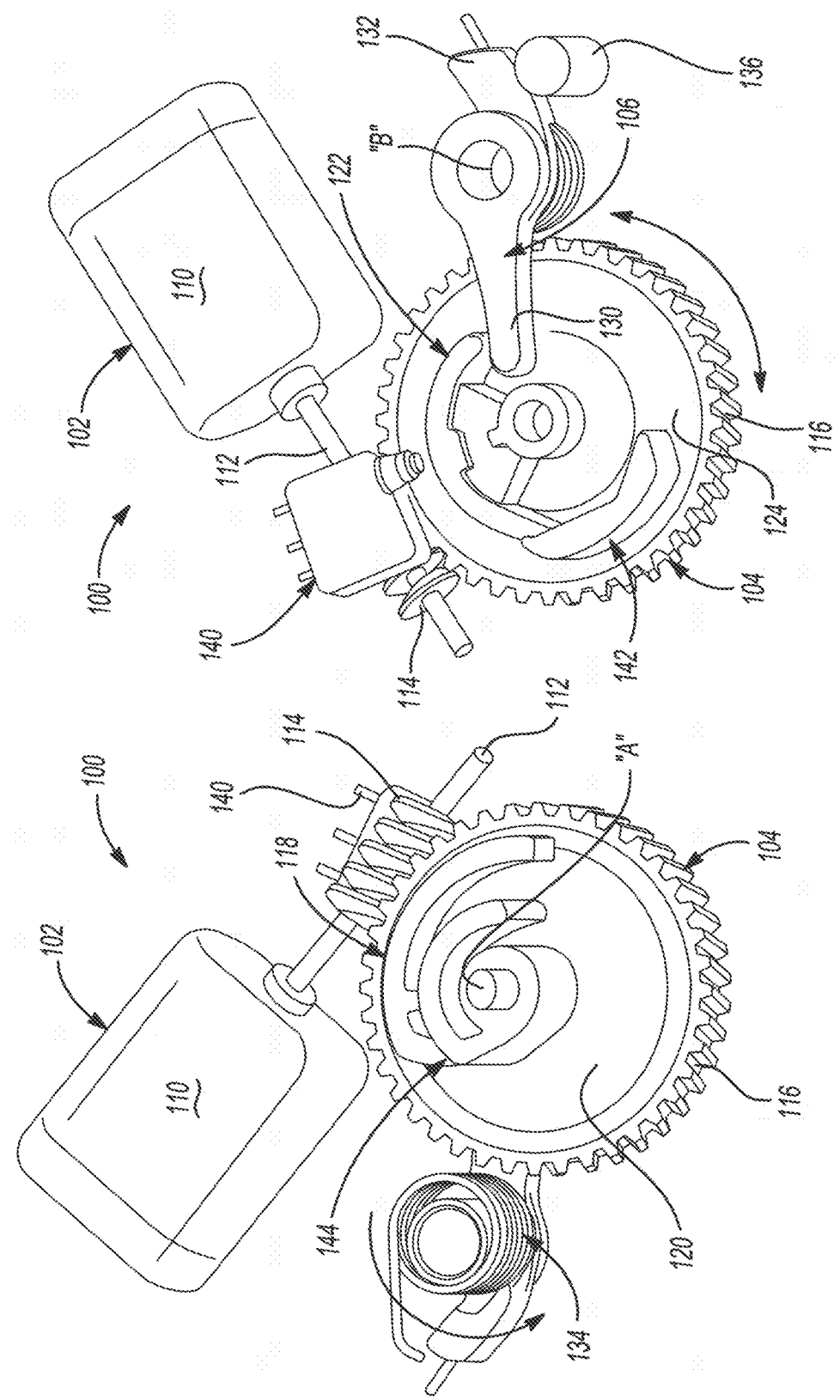

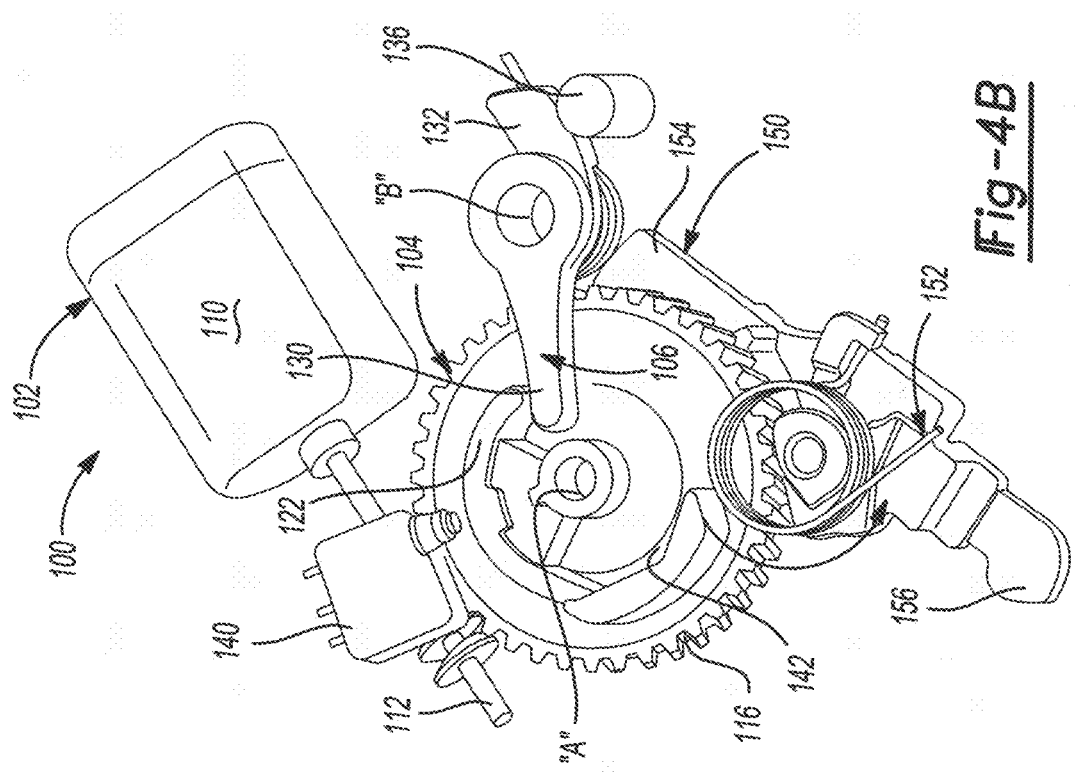
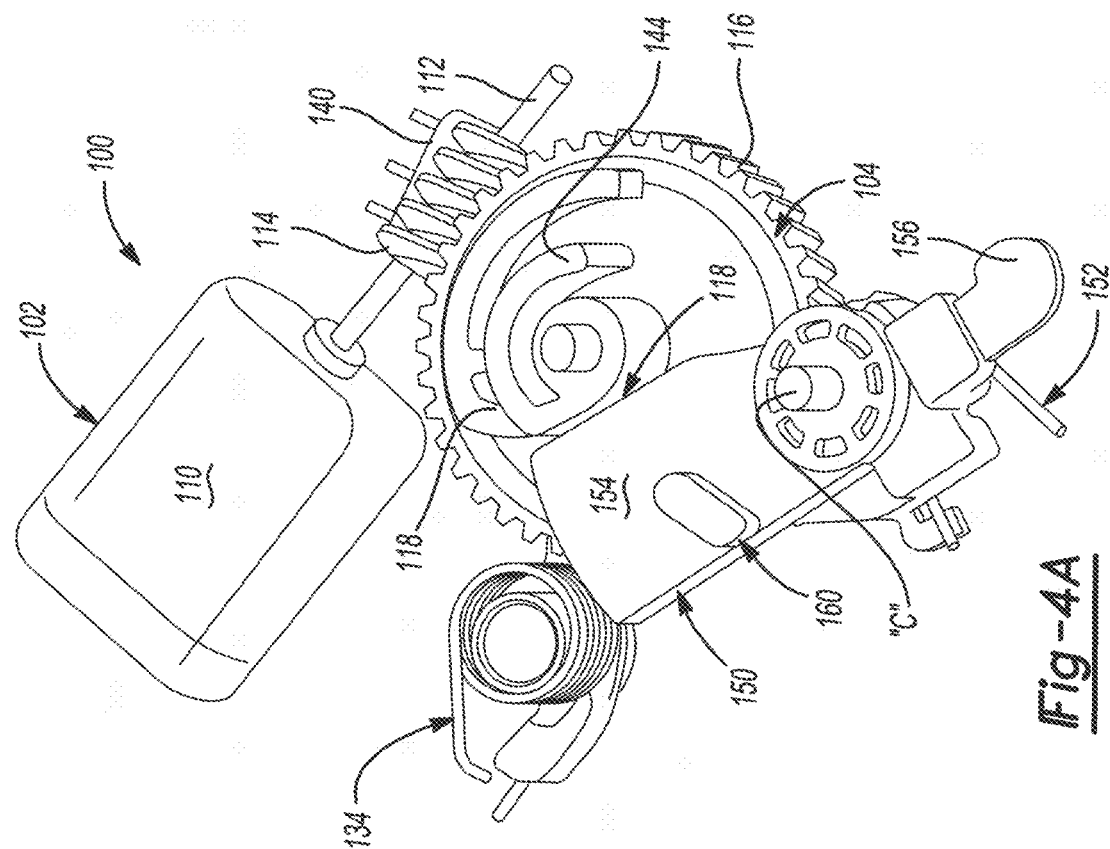

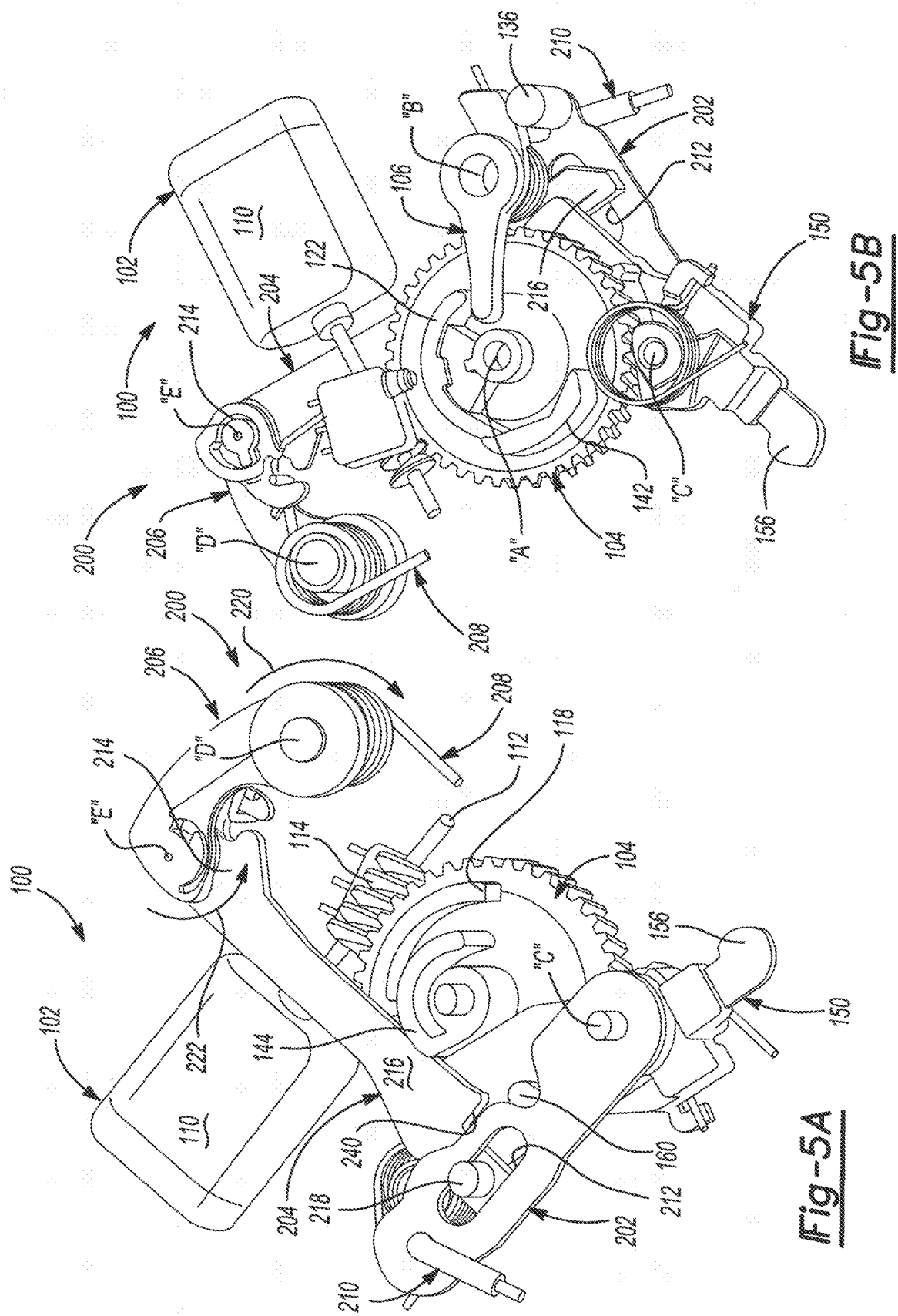

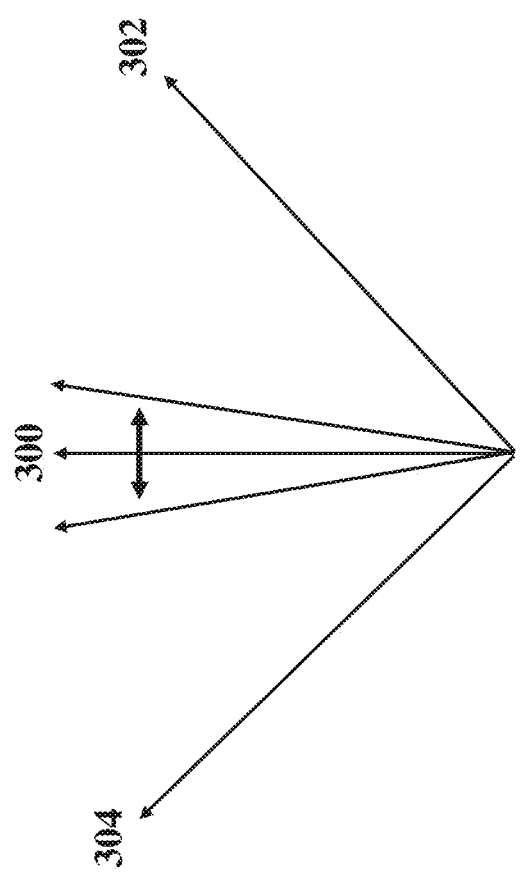

| 990 | 992 | 994 | 996 |
| 991 | 993 | 995 | 997 |

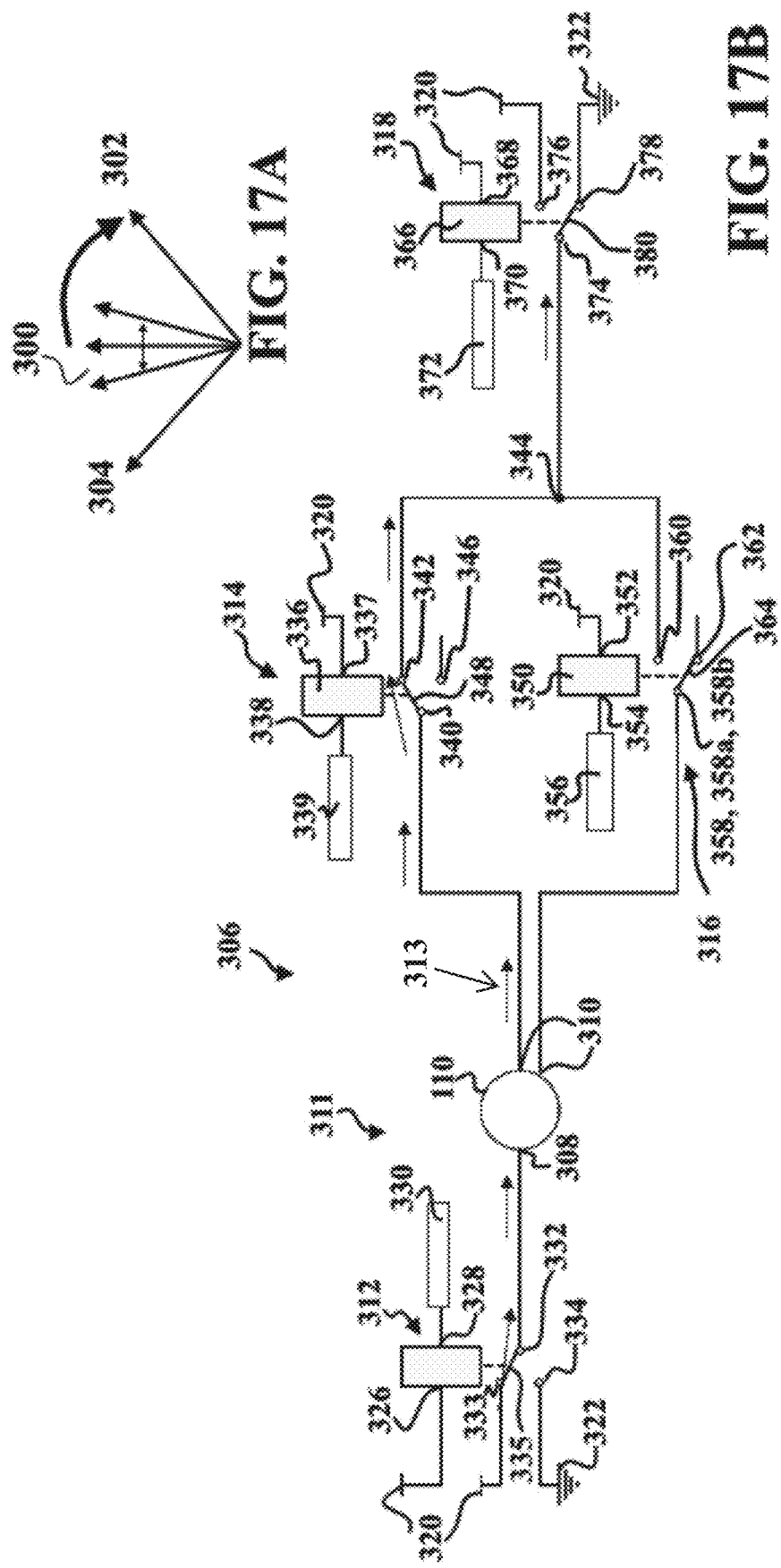

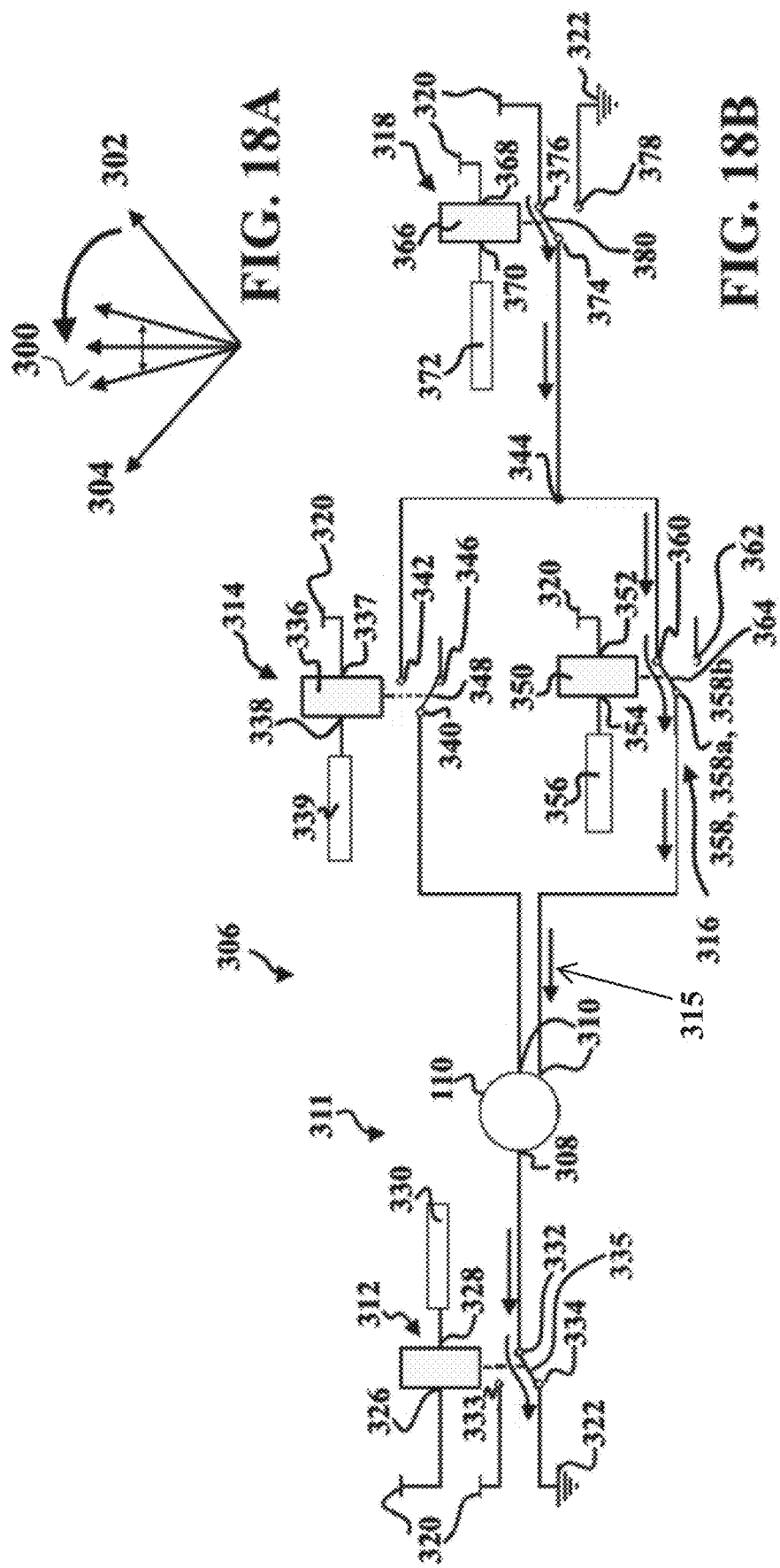

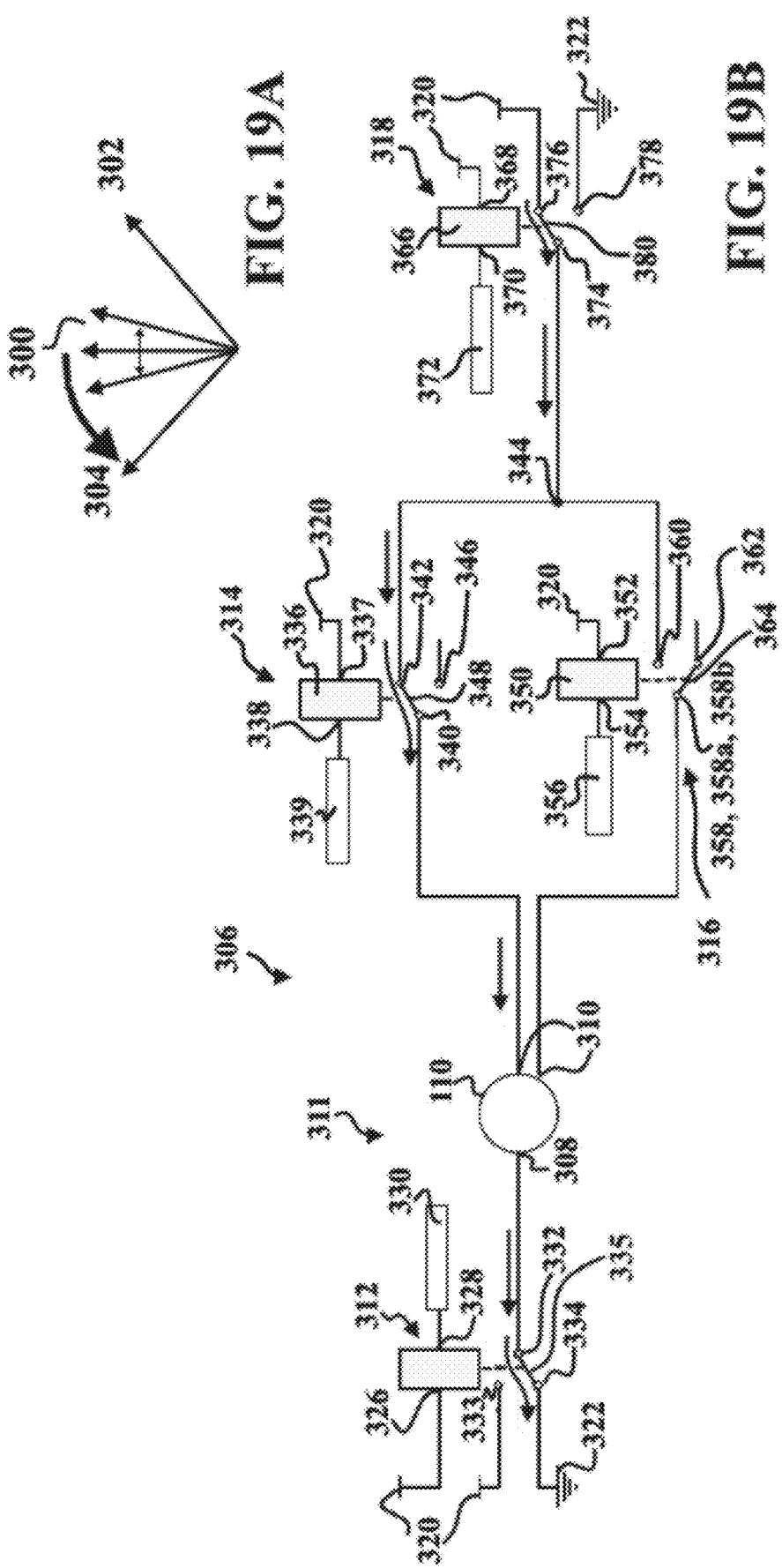

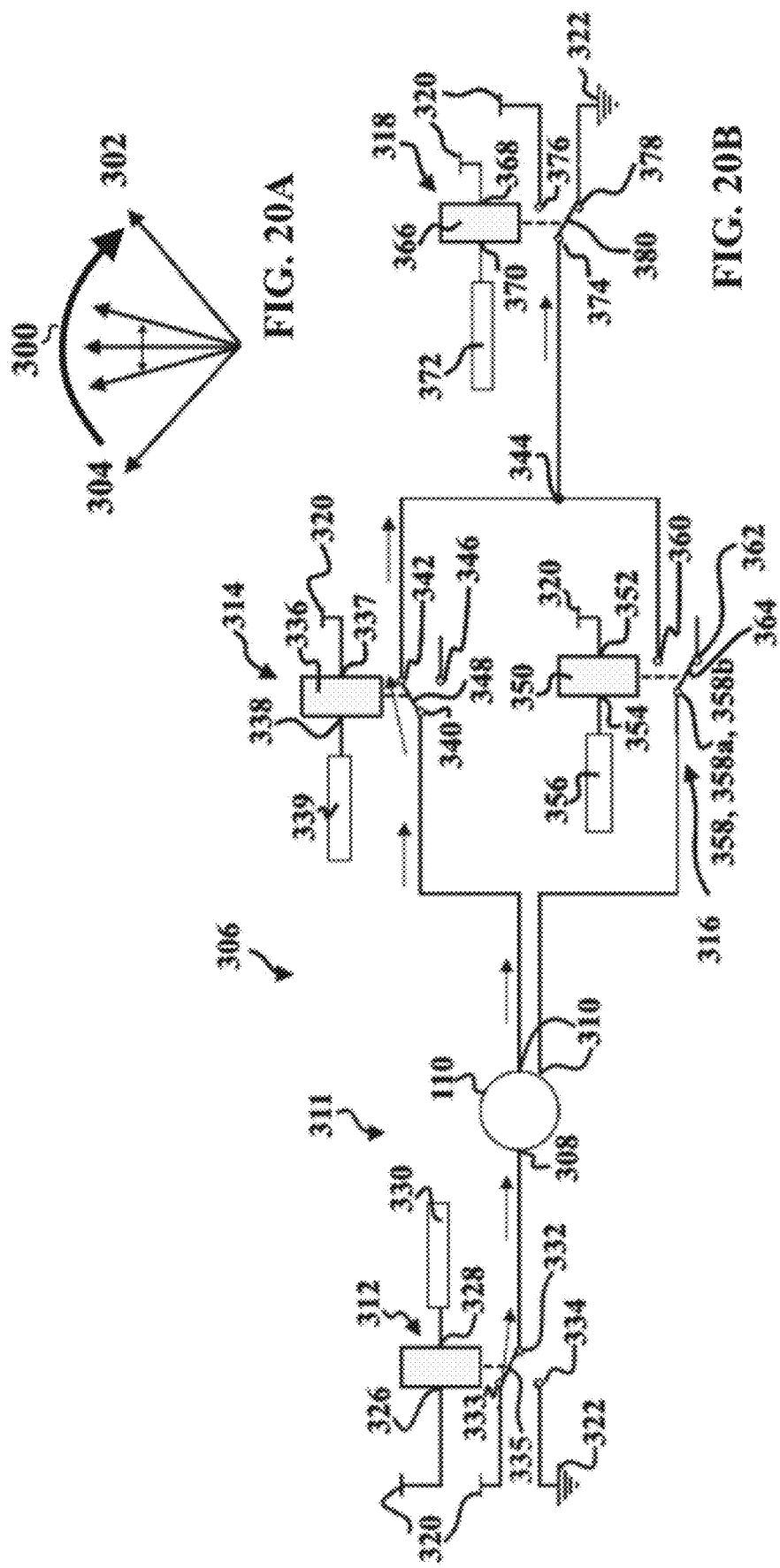

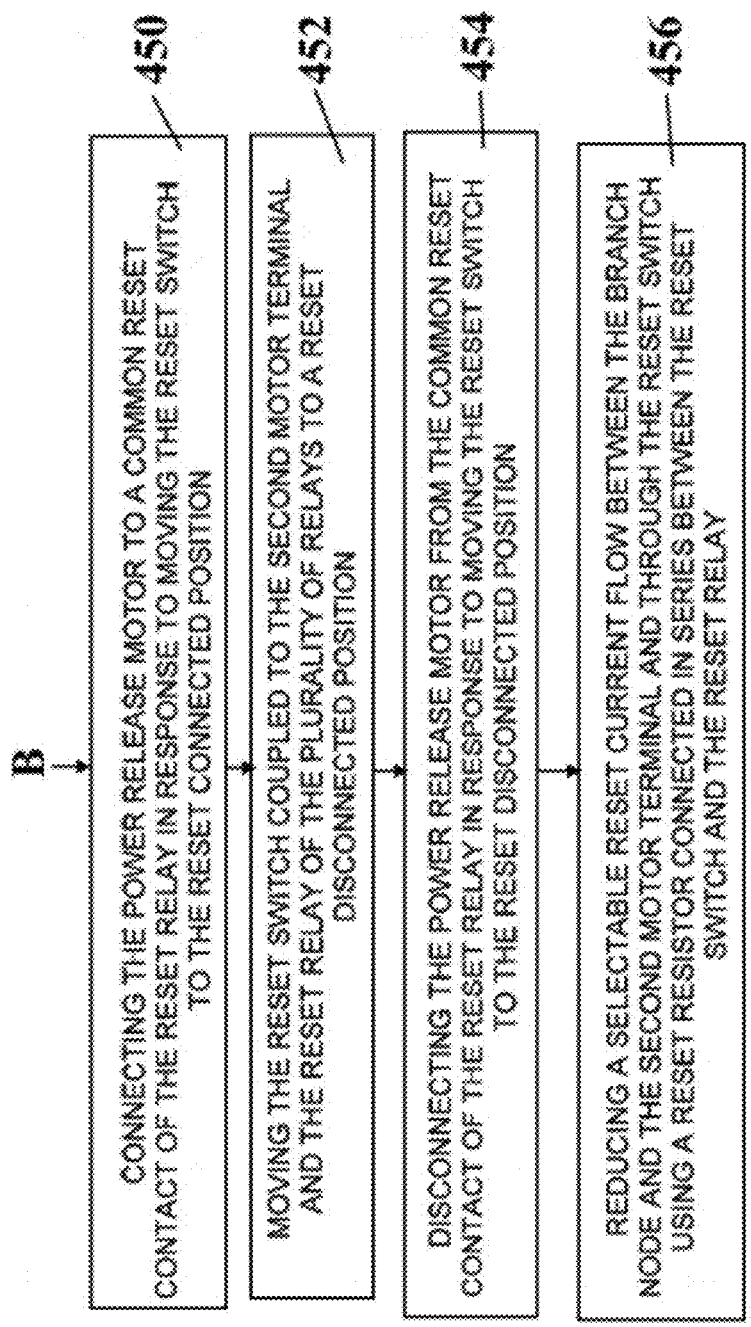

CLOSURE LATCH ASSEMBLY WITH A POWER RELEASE MECHANISM AND MOTOR CONTROL SYSTEM

CROSS REFERENCE TO RELATED APPLICATION

This application claims the benefit of U.S. Provisional Application Ser. No. 62/733,884 filed Sep. 20, 2018. The entire disclosure of the above application is incorporated herein by reference.

FIELD

The present disclosure relates generally to closure latch assemblies for motor vehicle closure systems. More specifically, the present disclosure relates to a closure latch assembly for a vehicle door equipped with a power release mechanism and a motor control system.

BACKGROUND

This section provides background information related to the present disclosure which is not necessarily prior art.

Passive entry systems for vehicles are provided on some vehicles to permit a vehicle user who is in possession of a key fob to simply pull the door handle and open the door without the need to introduce a key into a keyhole in the door. The key fob is typically equipped with an electronic device that communicates with the vehicle's on-board control system to authenticate the user. When the user actuates the unlock switch on the key fob and subsequently pulls the outside door handle to indicate that he/she wishes entry into the vehicle, an electric actuator of a power-operated latch release mechanism associated with a door-mounted closure latch assembly is actuated to release a latch mechanism for allowing the door to be opened. The outside door handle may also be equipped with a switch that triggers actuation of the electric actuator when the key fob is detected in the user's possession. In some closure latch assemblies, the latch mechanism may also be manually released from inside the vehicle since the inside door handle is connected to the latch mechanism via an inside handle release mechanism associated with the closure latch assembly. In some jurisdictions, however, there are regulations that govern the degree of connection provided by the inside handle release mechanism between the inside door handle and the latch mechanism (particularly for a rear door, where children may be the occupants).

Many modern closure latch assemblies provide one or more power-operated functions including power release, power lock, power child lock, and power cinch or soft-close features. Loss of power to the closure latch assembly may render such power-operated functions inoperable. To avoid entrapment within the passenger compartment upon loss of the power release and/or power lock functions, for example, most closure latch assemblies have the inside handle release mechanism configured to be activated via the inside door handle to release the latch mechanism and open the vehicle door. Typically, such "backup" latch release arrangements, particularly those associated with lost power conditions, are complicated and the actuation requirements (e.g., double pull) may not be intuitive to the vehicle occupant.

During door opening actions with a closure latch assembly having a power release function, the electric actuator of the power-operated latch release mechanism is typically driven in both a release direction and a reset direction to complete such an action. In situations in which the vehicle is equipped with a mechanical outside handle (e.g., the outside handle is mechanically coupled to the closure latch assembly using cables and/or rods), it may be desirable for the outside handle to be disengaged during normal usage and only engaged in case of a vehicle crash. Some solutions may utilize power to move from a reset position to an unlock position, while a return spring may help drive the mechanism back to the reset position in case of a vehicle crash; however, such solutions may result in additional noise.

Accordingly, while commercially-available powered closure latch assemblies are satisfactory to meet all operational and regulatory requirements, a recognized need exists to advance the technology and provide optimized closure latch assemblies and systems having reduced complexity and packaging, while providing both the desired power-operated functions and emergency release function previously mentioned with minimal noise.

SUMMARY

This section provides a general summary of the disclosure and is not intended to be interpreted as a comprehensive and exhausting listing of its full scope or all of its features and advantages.

According to one aspect, there is provided a motor control system for a power operated mechanism of a closure latch assembly including a motor having a first motor terminal and a second motor terminal and operatively coupled to the power operated mechanism. The system includes a motor control circuit coupled between one of the first motor terminal and the second motor terminal and one of a voltage supply and an electrical ground to control a power supply to the motor and drive the motor in a first direction and in a second direction. The motor control circuit is configured to control the motor by providing the power supply in a first operation mode to drive the motor in the first direction and in a second operation mode to drive the motor in the second direction. A speed of the motor when driven in the first operation mode is different than the speed of the motor when driven in the second operation mode.

Another aspect of the present disclosure is to provide a motor control system for a power release mechanism of a closure latch assembly. The system includes a power release motor including a first motor terminal and a second motor terminal. The power release motor is operatively coupled to a power release gear of the power release mechanism. The system also includes a motor control circuit coupled between one of the first motor terminal and the second motor terminal and one of a voltage supply and an electrical ground to control a current supply to the power release motor and drive the power release motor in a first direction and in a second direction. An electronic control unit is coupled to the motor control circuit and is configured to control the power release motor by commanding the motor control circuit to provide a first motor current flow in a first operation mode to drive the power release in the first direction. The motor control circuit also may be commanded to provide a second motor current flow in a second operation mode to drive the power release motor in the second direction. The speed of the power release motor when driven in the first operation mode is different than the speed of the power release motor when driven in the second operation mode.

In yet another aspect, there is provided a closure latch system for a vehicle door. The system includes a closure latch assembly having a latch mechanism including a ratchet and a pawl. The ratchet is moveable between a striker release position and a striker capture position. The pawl is moveable between a ratchet holding position whereat the pawl holds the ratchet in its striker capture position and a ratchet releasing position whereat the pawl permits the ratchet to move to its striker release position. The closure latch assembly also includes a latch release mechanism including a latch release lever moveable between a home position whereat the pawl is maintained in its ratchet holding position and a pawl release position whereat the latch release lever moves the pawl to its ratchet releasing position. The closure latch assembly additionally includes a power release mechanism that has a power release motor, a power release gear driven by the power release motor, and an actuator lever. The actuator lever is moveable between a non-actuated position whereat the latch release lever is maintained in its home position and an actuated position whereat the actuator lever moves the latch release lever to its pawl release position. The power release gear is rotatable in a releasing direction from a central-home position to a released position for causing the actuator lever to move from its non-actuated position into its actuated position. The power release gear is rotatable in an unlocking direction from its central-home position to an unlocked position. The system also includes a motor control system having a motor control circuit coupled between one of a first motor terminal and a second motor terminal of the power release motor and one of a voltage supply and an electrical ground to control a current supply to the power release motor and move the power release gear between its unlocked position and its central-home position and its released position. The motor control system also includes an electronic control unit coupled to the motor control circuit. The electronic control unit is configured to control the power release motor by commanding motor control circuit to provide a first motor current flow in a first operation mode to drive the power release motor in the first direction and a second motor current flow in a second operation mode to drive the power release motor in the second direction, wherein a speed of the power release motor when driven in the first operation mode is different than the speed of the power release motor when driven in the second operation mode.

In accordance with a further aspect, there is provided a method of controlling a power actuation motor of a power actuation mechanism of a closure latch assembly, or other vehicle actuation mechanism. The method includes the step of supplying the power release motor with a first motor current flow to drive the power release motor with a first speed in a first operation mode. The method also includes the step of supplying the power release motor with a second motor current flow to drive the power release motor with a second speed different than the first speed in a second operation mode.

In accordance with a related aspect of the method, the method further includes the step of determining whether to operate in one of a power release mode and a release mode and a reset mode and an unlock mode. The method continues by determining whether the power release motor should move in one of a first direction and a second direction opposite the first direction using an electronic control unit. Next, commanding a plurality of relays coupled to the electronic control unit and between one of a first motor terminal and a second motor terminal and one of a voltage supply and an electrical ground in response to determining that the power release motor should move in the first direction using the electronic control unit in one of the power release mode and the release mode. The method also includes the step of providing the first motor current flow from the voltage supply to the first motor terminal of the power release motor through the second motor terminal to the electrical ground using the plurality of relays. The method proceeds with the step of driving the power release motor in the first direction with the first motor current flow; commanding the plurality of relays in response to determining that the power release motor should move in the second direction using the electronic control unit in one of the reset mode and the unlock mode. The next step of the method is providing the second motor current flow from the voltage supply to the second motor terminal through the first motor terminal to the electrical ground using the plurality of relays. The method also includes the step of driving the power release motor in a second direction with the second motor current flow.

In accordance with a related aspect of the method, the step of commanding the plurality of relays coupled to the electronic control unit and between one of the first motor terminal and the second motor terminal and one of the voltage supply and the electrical ground in response to determining that the power release motor should move in the first direction using the electronic control unit in one of the power release mode and the release mode includes the step of connecting the voltage supply to the first motor terminal using a release relay of the plurality of relays in the power release mode. Next, connecting the second motor terminal to a branch node using an unlock relay of the plurality of relays in the power release mode. Then, the method includes connecting the branch node to the electrical ground using a power control relay of the plurality of relays in the power release mode. The method continues by connecting the voltage supply to the first motor terminal using a release relay of the plurality of relays in the release mode. Next, connecting the second motor terminal to a branch node using an unlock relay of the plurality of relays in the release mode. The method also includes connecting the branch node to the electrical ground using a power control relay of the plurality of relays in the release mode.

In accordance with a related aspect of the method, the method further includes the step of disconnecting the second motor terminal from the branch node using a reset relay of the plurality of relays in the power release mode and disconnecting the second motor terminal from the branch node using the reset relay of the plurality of relays in the release mode.

In accordance with a related aspect of the method, the step of commanding the plurality of relays in response to determining that the power release motor should move in the second direction using the electronic control unit in one of the reset mode and the unlock mode includes the step of connecting the voltage supply to a branch node using a power control relay of the plurality of relays in the reset mode. Then, connecting the branch node to the second motor terminal using a reset relay of the plurality of relays in the reset mode. The method continues by connecting the first motor terminal to the electrical ground using a release relay of the plurality of relays in the reset mode. The method also includes the step of connecting the voltage supply to the branch node using the power control relay of the plurality of relays in the unlock mode. The method proceeds with the steps of connecting the branch node to the second motor terminal using an unlock relay of the plurality of relays in the unlock mode and connecting the first motor terminal to the electrical ground using a release relay of the plurality of relays in the unlock mode.

In accordance with a related aspect of the method, the method further includes the steps of disconnecting the branch node from the second motor terminal using the unlock relay of the plurality of relays in the reset mode and disconnecting the branch node from the second motor terminal using the reset relay of the plurality of relays in the unlock mode.

In accordance with a related aspect of the method, the method can further include the step of moving a reset switch coupled to the second motor terminal and a reset relay of the plurality of relays to a reset connected position. Next, connecting the power release motor to a common reset contact of the reset relay in response to moving the reset switch to the reset connected position. The method can then proceed by moving the reset switch coupled to the second motor terminal and the reset relay of the plurality of relays to a reset disconnected position. The method also includes the step of disconnecting the power release motor from the common reset contact of the reset relay in response to moving the reset switch to the reset disconnected position.

In accordance with a related aspect of the method, the method further includes the step of reducing a selectable reset current flow between a branch node and the second motor terminal and through the reset switch using a reset resistor connected in series between the reset switch and the reset relay.

Further areas of applicability will become apparent from the description provided hereon. The description and specific examples in this summary are intended for purposes of illustration only and are not intended to limit the scope of the present disclosure.

BRIEF DESCRIPTION OF THE DRAWINGS

The drawings described herein are provided for illustrating selected, non-limiting embodiments of the present disclosure. The present disclosure will now be described by way of example with reference to the attached drawings, in which:

FIG. 3A is a top isometric view and FIG. 3B is a bottom isometric view of a power release mechanism associated with the closure latch assembly of the present disclosure;

FIGS. 4A and 4B are built-up versions of FIGS. 3A and 3B, respectively, showing additional components of the power release mechanism;

FIGS. 5A and 5B are built-up versions of FIGS. 4A and 4B, respectively, now showing additional components of an inside handle release mechanism associated with the closure latch assembly of the present disclosure;

FIG. 13 shows various positions of a power release motor and power release gear of the power release mechanism according to aspects of the disclosure;

FIG. 17A shows the movement of the power release gear in a power release mode according to aspects of the disclosure;

FIG. 17B shows a first motor current flow corresponding to the movement of the power release gear in the power release mode according to aspects of the disclosure;

FIG. 18A shows the movement of the power release gear in a reset mode according to aspects of the disclosure;

FIG. 18B shows a second motor current flow corresponding to the movement of the power release gear in the reset mode according to aspects of the disclosure;

FIG. 19A shows the movement of the power release gear in an unlock mode according to aspects of the disclosure;

FIG. 19B shows a first motor current flow corresponding to the movement of the power release gear in the unlock mode according to aspects of the disclosure;

FIG. 20A shows the movement of the power release gear in a release mode according to aspects of the disclosure;

FIG. 20B shows a second motor current flow corresponding to the movement of the power release gear in the release mode according to aspects of the disclosure; and FIGS. 21 and 22A-22C illustrate a method of controlling the power release motor of the power release mechanism according to aspects of the disclosure.

Corresponding reference numerals are used throughout all of the drawings to identity common components.

DETAILED DESCRIPTION

In general, example embodiments of closure latch assemblies and systems constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

Figure 1:
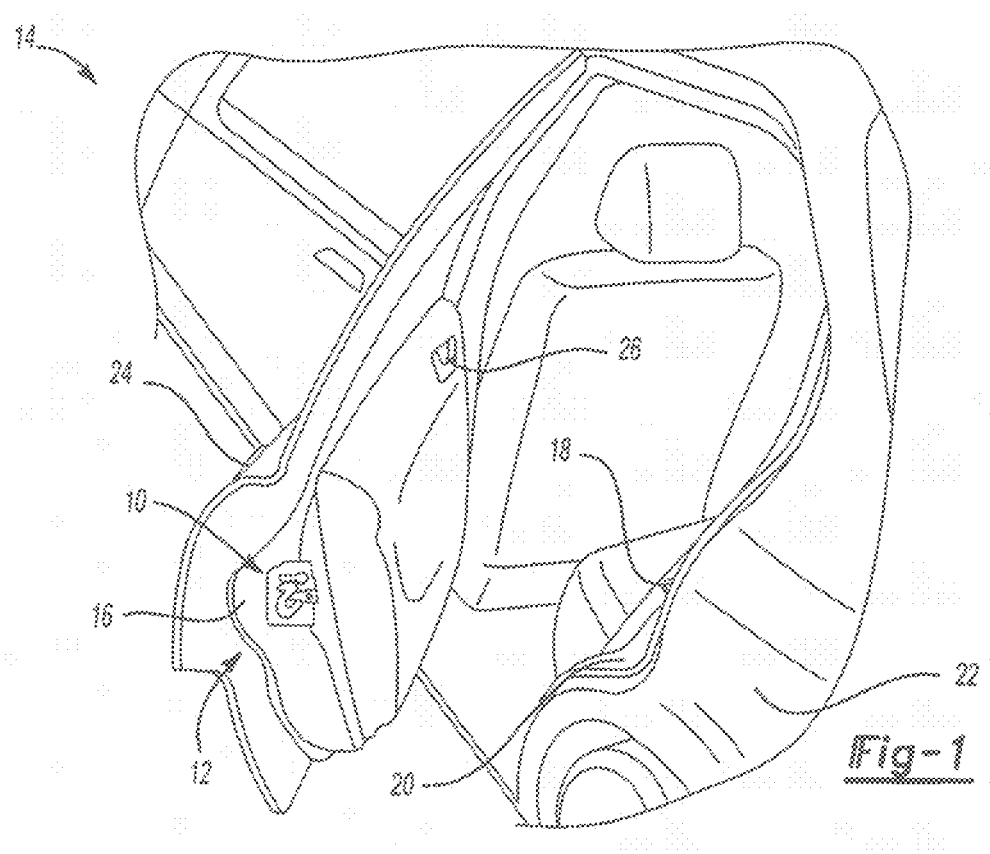
FIG. 1 is a partial isometric view of a motor vehicle having a passenger door equipped with a closure latch assembly constructed in accordance with the teachings of the present disclosure.

With reference to FIG. 1, a closure latch assembly 10 for a passenger door 12 of a motor vehicle 14 is shown positioned along a rear edge portion 16 of door 12 and is configured to releasably engage a striker 18 secured in a door opening 20 formed in the vehicle's body 22 in response to movement of door 12 from an open position (shown) to a closed position. Door 12 includes an outside door handle 24 and an inside door handle 26, both of which are operatively coupled (i.e., electrically and/or mechanically) to closure latch assembly 10.

Figure 2:
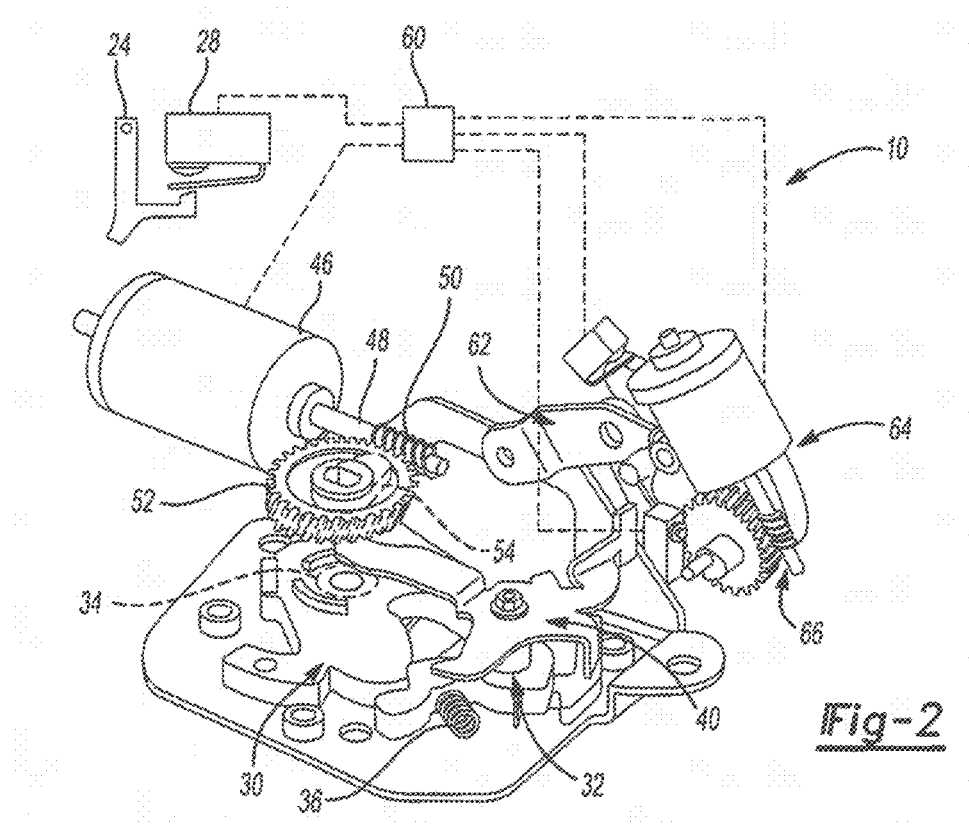
FIG. 2 is an isometric view of a closure latch assembly illustrating the components of a latch mechanism and a latch release mechanism associated with the present disclosure.

Referring now to FIG. 2, a non-limiting embodiment of closure latch assembly 10 is shown to generally include a latch mechanism, a latch release mechanism, a power release mechanism, an inside handle release mechanism, and a power lock mechanism. The latch mechanism includes a ratchet 30 and a pawl 32. Ratchet 30 is moveable between a first or "striker capture" position whereat ratchet 30 retains striker 18 and a second or "striker release" position whereat ratchet 30 permits release of striker 18. A ratchet biasing member, such as a torsion spring 34, biases ratchet 30 toward its striker release position. Pawl 32 is moveable relative to ratchet 30 between a first or "ratchet holding" position whereat pawl 32 holds ratchet 30 in its striker capture and a second or "ratchet releasing" position whereat pawl 32 permits ratchet spring 34 to forcibly move ratchet 30 from its striker capture position to its striker release position. A pawl biasing member, such as a coil spring 36, biases pawl 32 toward its ratchet holding position.

The latch release mechanism includes, among other things, a release lever 40 operatively connected to pawl 32 and which is moveable between a first or "pawl release" position whereat release lever 40 causes pawl 32 to move to its ratchet releasing position and a second or "home" position whereat release lever 40 permits pawl 32 to be maintained in its ratchet holding position. A release lever biasing member, such as a release lever spring (not shown), is provided to bias release lever 40 to its home position. Release lever 40 may be moved from its home position to its pawl release position by several components such as, for example, the power release mechanism and the inside handle release mechanism.

The power release mechanism, an illustrative example of a power operated mechanism of a closure latch assembly, includes, among other things, a power release electric motor 46 having a rotatable motor output shaft 48, a power release worm gear 50 secured to motor output shaft 48, a power release gear 52, and a power release cam 54. Power release cam 54 is connected for common rotation with power release gear 52 and is rotatable between a first or "rest" position and a second or "release" position. Power release gear 52 is driven by worm gear 50 and, in turn, drives power release cam 54 which controls movement of release lever 40 between its home and pawl release positions. Specifically, when power release cam 54 is located in its rest position, release lever 40 is maintained in its home position. However, rotation of power release cam 54 to its release position causes release lever 40 to move to its pawl release position, thereby providing a power releasing operation of the latch mechanism.

The power release mechanism may be used as part of a passive entry system. When a person approaches vehicle 14 with an electronic key fob and actuates outside door handle 24, an electronic latch release system associated with vehicle 14 senses both the presence of the key fob and that outside door handle 24 has been actuated (e.g., via communication between a switch 28 and an electronic control unit (ECU) 60 that at least partially controls the operation of closure latch assembly 10. In turn, ECU 60 actuates the power release mechanism to cause power release motor 46 to rotate power release cam 54 from its rest position into its release position for releasing the latch mechanism and unlatching closure latch assembly 10 so as to open vehicle door 12. Power release motor 46 thereafter causes power release cam 54 to rotate from its release position to its rest position for resetting the power release mechanism.

The inside handle release mechanism is shown to include an inside release lever 62 that is operatively coupled to inside handle 26 and which permits release of the latch mechanism from inside the passenger compartment of motor vehicle 14 under certain conditions. The power lock mechanism, another example of a power operated mechanism of a closure latch assembly, is shown to include, amongst other things, a power lock actuator 64 and a lock mechanism 66. The teachings herein may also be applied to other types of power operated mechanisms of a closure latch assembly actuated by a motor, such as a powered operated cinch mechanism, or a door presenter mechanism, as well as other standalone power operated mechanisms such as a remote actuator for such closure latch assemblies.

Referring now to FIGS. 3-12, the components associated with a non-limiting embodiment of a power release mechanism 100 and an inside handle release mechanism 200 are shown and which are adapted for use with closure latch assembly 10. FIGS. 3A and 3B illustrate power release mechanism 100 to generally include a power release actuator 102, a power release gear 104, and a gear lever 106. Power release actuator 102 is comprised of a power release motor 110 (e.g., electric motor) having a motor shaft 112 and an output gear shown as worm gear 114. Power release motor 110 is controlled by ECU 60 for rotatably driving motor shaft 112. Power release gear 104 is configured to include external gear teeth 116 meshed with the threads of worm gear 114, a release cam 118 formed on a first face surface 120, and a gear lever cam 122 formed on a second face surface 124. Power release gear 104 is supported for rotation about a gear axis "A".

Gear lever 106 is supported for pivoted movement about a lever axis "B" and is formed to include a drive lug segment 130 engaging gear lever cam 122 and a stop lug segment 132. A gear lever spring 134 is configured to bias drive lug segment 130 against gear lever cam 122 and to bias stop lug segment 132 against a stationary hard stop surface 136. Additionally, a power release stop sensor 140 is located adjacent to power release gear 104 for detecting the position of a stop cam 142 extending from second face surface 124 on power release gear 104. The power release gear position signal generated by power release stop sensor 140 is communicated to ECU 60. Power release gear 104 also includes a raised link lever cam 144 extending from first face surface 120, the function of which will be described hereinafter.

Power release gear 104 is rotatable about axis "A" in a "power releasing" direction from a first or "central-home"

position 300 (FIG. 13) to a second or "released" position 302 (FIG. 13). Opposite rotation of power release gear 104 in a "power resetting" direction functions to return power release gear 104 from its released position 302 to its central-home position 300. In addition, power release gear 104 is rotatable in an "unlocking" direction from its central-home position 300 to a third or "unlocked" position 304 (FIG. 13). Opposite rotation of power release gear 104 in an "unlock resetting" direction functions to return power release gear 104 from its unlocked position 304 to its central-home position 300. Thus, a three (3) position power release gear 104 is associated with power release mechanism 100. As will be detailed, power release mechanism 100 is defined as operating in a Neutral state when power release gear 104 is located in its central-home position 300, as operating in a Released state when power release gear 104 is located in its released position 302, and as operating in an Unlocked state when power release gear 104 is located in its unlocked position 304. Each of these three distinct operating states provides a different functionality hereinafter described.

Referring now to FIGS. 4A and 4B, additional components of power release mechanism 100 are shown built upon the components shown in FIGS. 3A to 3B, respectively and include an actuator lever 150 and an actuator lever spring 152. Actuator lever 150 is pivotably moveable about an actuator lever axis "C" and includes a plate segment 154 and an actuator lug segment 156. Actuator lug segment 156 is positioned to selectively engage release lever 40 of the latch release mechanism. In particular, movement of actuator lever 150 from a first or "non-actuated" position to a second or "actuated" position causes actuator lug segment 156 to forcibly move release lever 40, in opposition to the biasing of release lever spring 42, from its home position to its pawl release position. As previously noted, such movement of release lever 40 results in movement of pawl 32 to its ratchet releasing position for releasing the latch mechanism. Actuator lever spring 152 is operable to normally bias actuator lever 150 toward its non-actuated position. A first drive member, hereinafter referred to as drive lug 160, extends from plate segment 154 of actuator lever 150, the function of which is described hereinafter.

Referring to FIGS. 5A and 5B, components of inside handle release mechanism 200 are now shown built upon the components of power release mechanism 100 shown in FIGS. 4A and 4B, respectively. Inside handle release mechanism 200 generally includes an emergency lever 202, a link lever 204, an auxiliary lever 206, and an auxiliary lever spring 208. Emergency lever 202 is pivotably supported for movement about an actuator lever axis "C" from a first or "home" position to a second or "pulled" position in response to actuation of inside door handle 26 from a first or "rest" position to a second or "actuated" position. In this regard, an inside handle connection device 210 (i.e. cable, rod, linkage, etc.) is shown for mechanically interconnecting emergency lever 202 to inside door handle 26. Emergency lever 202 is also shown to include an elongated guide slot 212 formed therein. Auxiliary lever 206 is shown supported for pivoted movement about an auxiliary lever axis "D".

Link lever 204 is an elongated member having a first end segment 214 pivotably coupled to auxiliary lever 106 about a link lever pivot point "E", and a second end segment 216 having a drive post 218 disposed within guide slot 212 of emergency lever 202. Auxiliary lever spring 208 acts between a stationary component and link lever 204 to normally bias auxiliary lever 206 in a first direction (as indicated by arrow 220) into engagement with a stationary hard stop 230 (FIG. 6). This biasing causes a corresponding biasing in a first direction of link lever 204 about pivot point "E" (as indicated by arrow 220). As will be detailed, link lever 204 is pivotably moveable relative to pivot axis "E" between a first or "uncoupled" position and a second or "coupled" position. Auxiliary lever spring 208 also functions to bias an intermediate segment of link lever 204 into continuous engagement with link lever cam 144 on power release gear 104. As will be detailed, inside handle release mechanism 200 is defined as operating in a Disengaged State when link lever 204 is located in its uncoupled position and as operating in an Engaged State when link lever 204 is located in its coupled position.

Figure 6A:
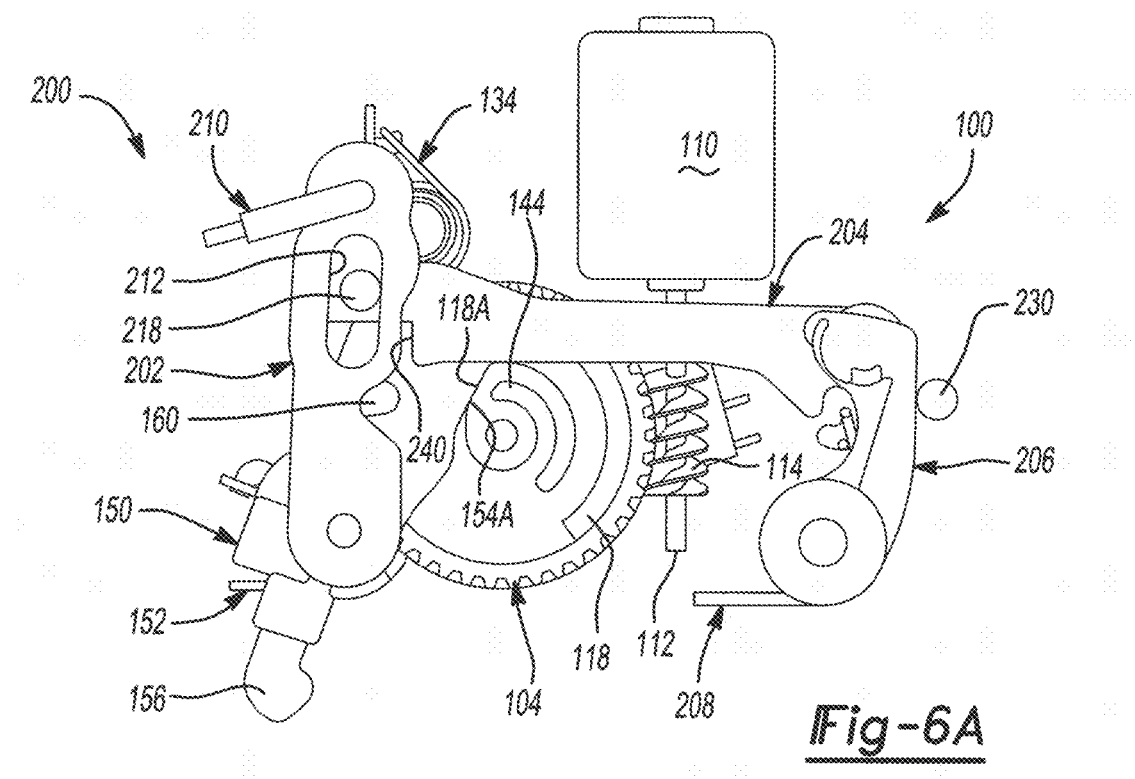
FIGS. 6A and 6B are top and bottom plan views illustrating the closure latch assembly in a Latched mode with the power release mechanism operating in a Neutral state and the inside handle release mechanism operating in a Disengaged state.
Figure 6B:
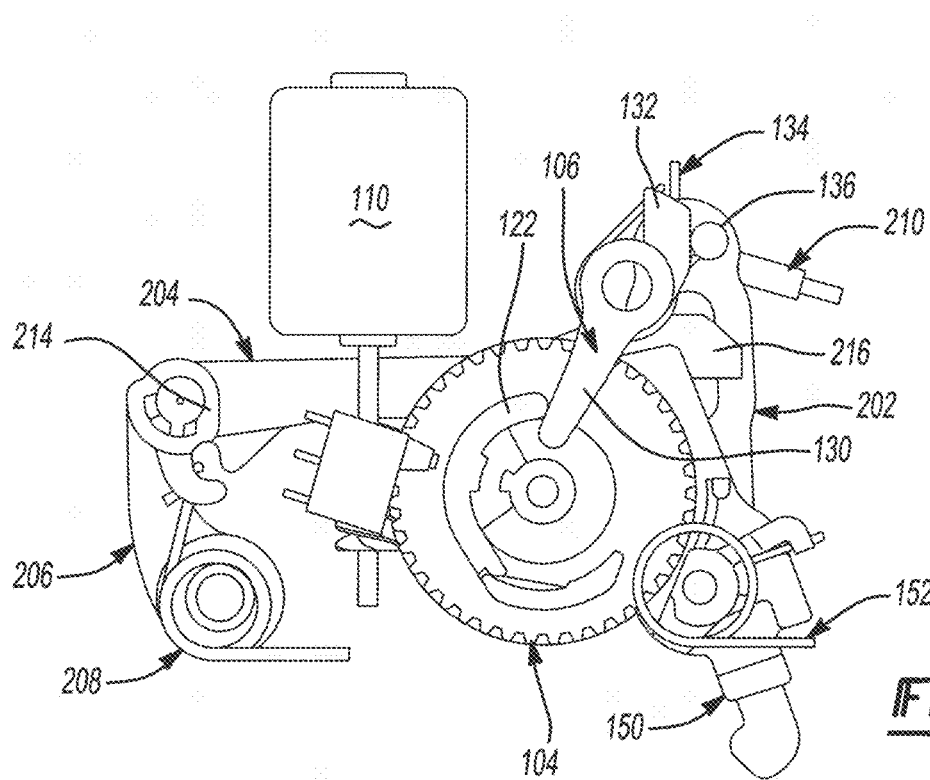

Referring now to FIGS. 6A and 6B, closure latch assembly 10 is shown in a Latched mode with power release mechanism 100 operating in its Neutral state and inside handle release mechanism 200 operating in its Disengaged state. To establish the Latched mode, the components are in the following positions: ratchet 30 is located in its striker capture position; pawl 32 is located in its ratchet holding position; power release gear 104 is located in its central-home position; actuator lever 150 is located in its non-actuated position; emergency lever 202 is located in its home position; link lever 204 is located in its uncoupled position; and inside door handle 26 is located in its rest position. As such, a cam edge 118A of release cam 118 is shown located adjacent to a cam edge 154A formed on plate segment 154 of actuator lever 150. With link lever 204 held by link lever cam 144 in its uncoupled position, a second drive member, hereinafter referred to as drive notch 240, formed on second end segment 216 of link lever 204 is positioned above drive lug 160 on plate segment 154 of actuator lever 150. FIG. 6B also illustrates drive lug segment 130 of gear lever 106 biased by gear lever spring 134 into engagement with an end portion of gear lever cam 122 on power release gear 104.

Figure 7A:
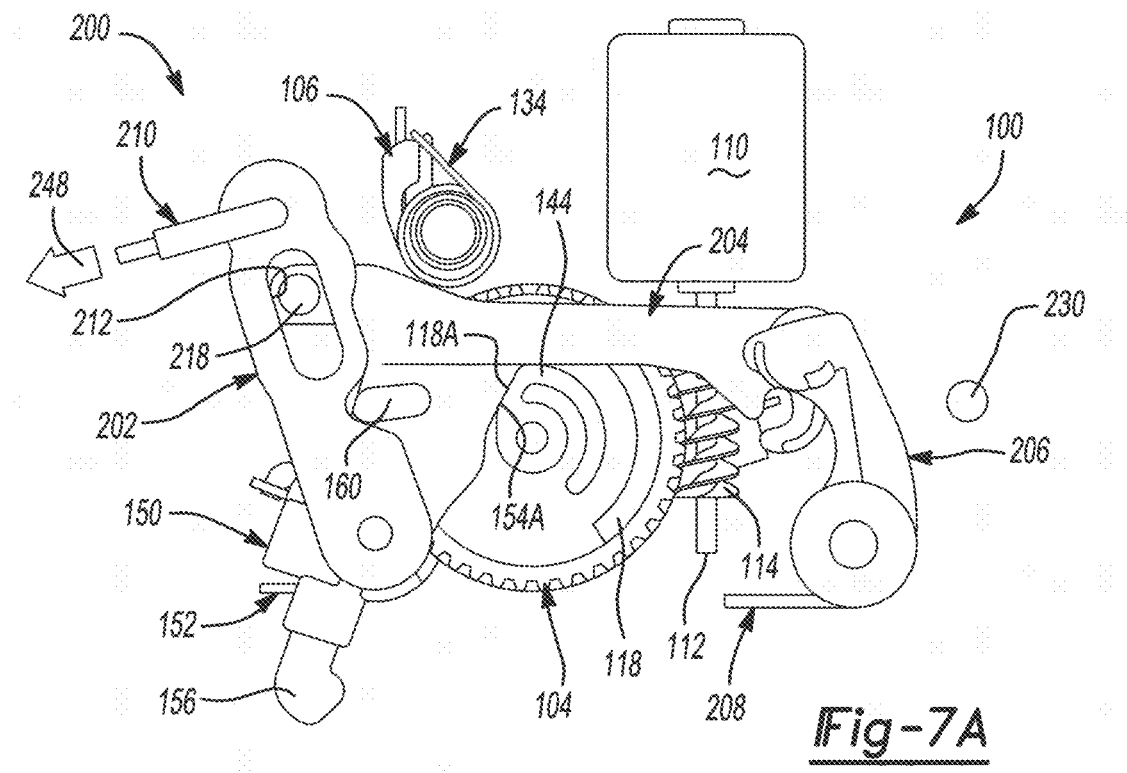
FIGS. 7A and 7B are top and bottom plan views, similar to FIGS. 6A and 6B, respectively, but now showing actuation of an inside door handle with the closure latch assembly maintained in its Latched mode.
Figure 7B:
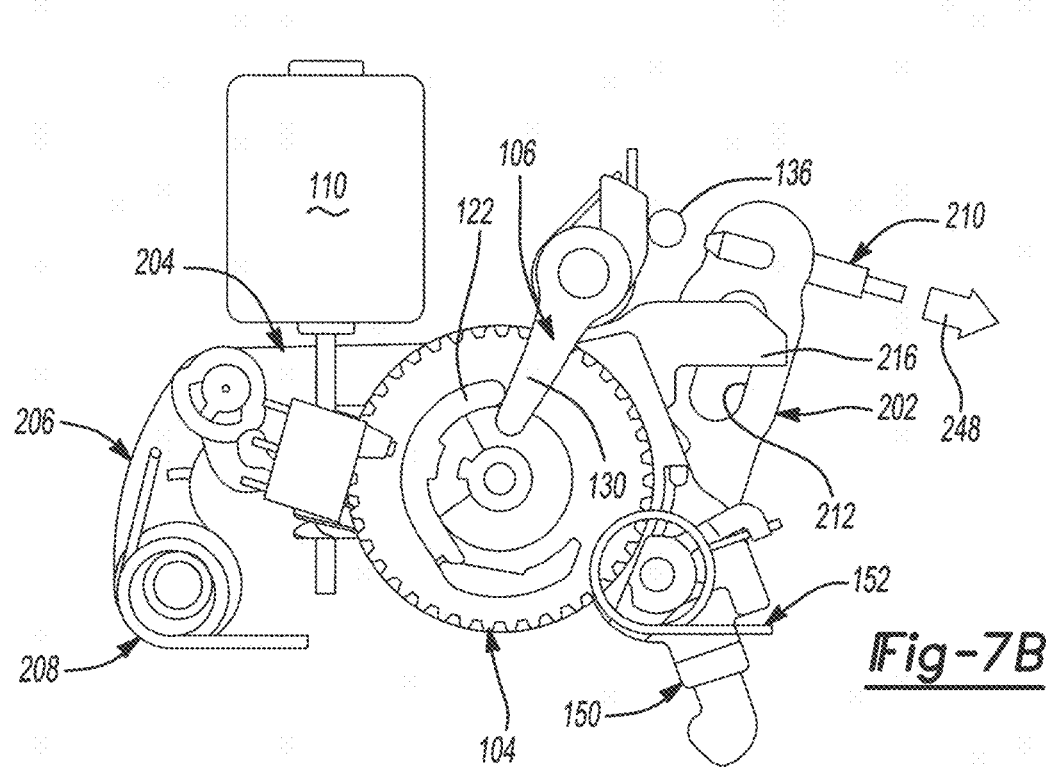

FIGS. 7A and 7B illustrate that link lever 204 remains disengaged or uncoupled from actuator lever 150 when inside door handle 26 is moved from its rest position into its actuated position, as indicated by arrow 248. Specifically, emergency lever 202 is shown moved via inside connection device 210 from its home position (FIGS. 5A, 5B) into its pulled position. However, link lever cam 144 on power release gear 104 continues to hold link lever 204 in its uncoupled position such that drive notch 240 on link lever 204 is not engaged with drive lug 160 on actuator lever 150. Thus, translational movement of link lever 204 in response to such pivotal movement of emergency lever 202 (due to retention of drive post 218 within guide slot 212) does not result in concurrent movement of actuator lever 150 out of its non-actuated position. As such, actuation of inside door handle 26 does not result in release of the latch mechanism and closure latch assembly 10 is maintained in its Latched mode.

Figure 8A:
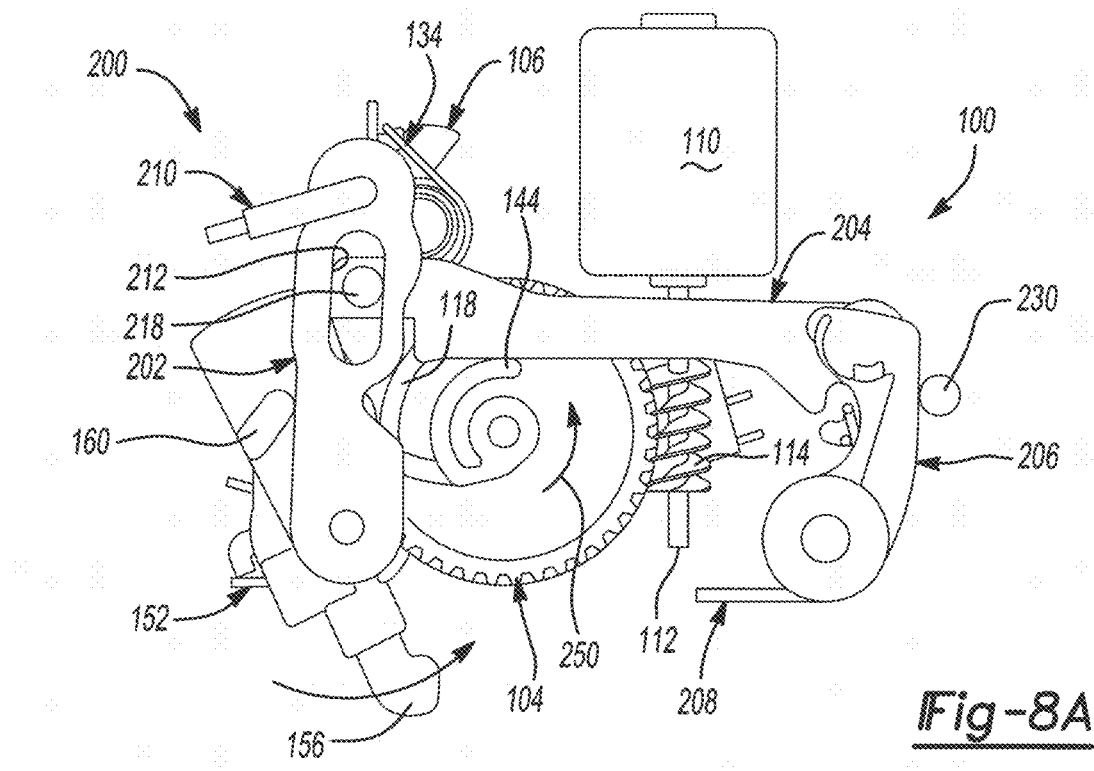
FIGS. 8A and 8B are top and bottom plan views, similar to FIGS. 6A and 6B, respectively, but now showing the closure latch assembly shifted into a Power Release mode via a power releasing operation with the power release mechanism operating in a Released state and the inside handle release mechanism maintained in its Disengaged state.
Figure 8B:
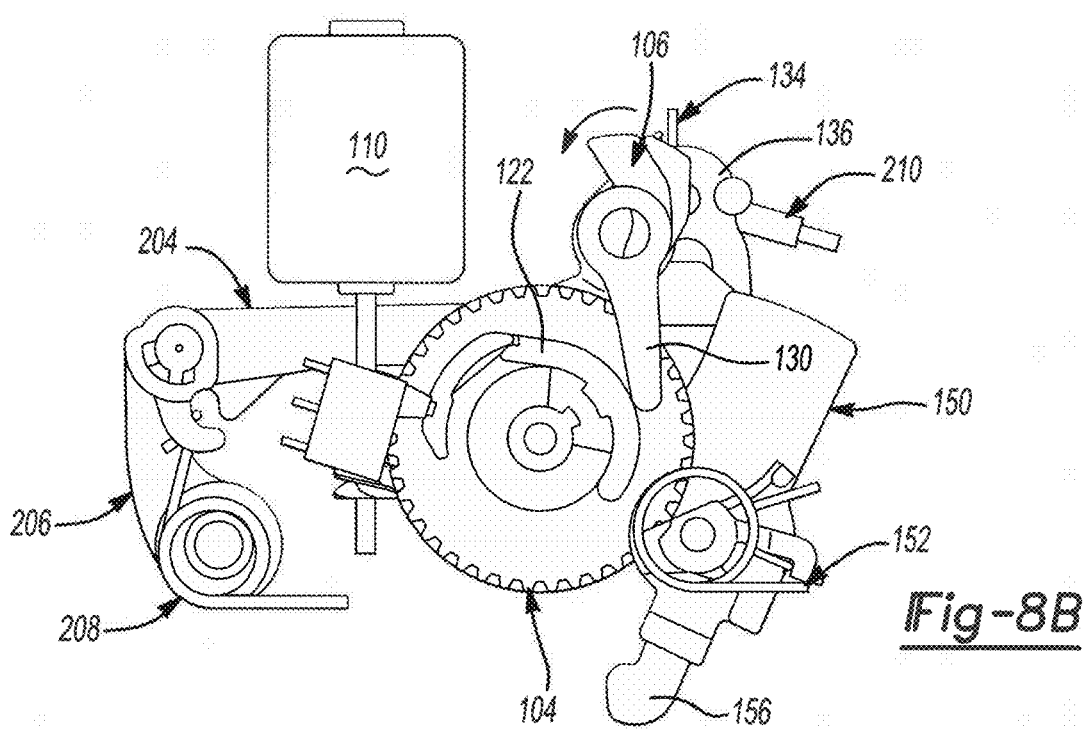

For showing the movement of the components associated with a power releasing function, reference is now directed to FIGS. 6A and 6B, which illustrate closure latch assembly 10 operating in its Latched mode and to FIGS. 8A and 8B which illustrate closure latch assembly 10 operating in a Power Release mode. Specifically, when a power release operations of the latch mechanism is properly requested and ECU 60 determines that a full power condition is supplied to closure latch assembly 10, power release motor 110 is energized for rotating power release gear 104 in a power releasing direction (i.e., counterclockwise in FIG. 8A), as indicated by arrow 250, from its central-home position 300 (FIG. 13) into its released position 302 (FIG. 13). Power release stop switch 140 is actuated when power release gear 104 is located in its released position 302. Such rotation of power release gear 104 causes cam edge 118A on release cam 118 to engage cam edge 154A on actuator lever 150 and forcibly pivot actuator lever 150 from its non-actuated position to its actuated position. This action results in movement of release lever 40 from its home position to its pawl release position for causing pawl 32 to move to from its ratchet holding position its ratchet releasing position, thereby releasing ratchet 30 to move from its striker capture position to its striker release position. Note that lever link cam 144 continues to hold link lever 204 in its uncoupled position while emergency lever 202 is maintained in its home position. Also note from FIG. 8B that rotation of power release gear 104 to its released position causes gear lever cam 122 to forcibly pivot gear lever 106 from its home position (FIG. 6B) to a loaded position, in opposition to the biasing of gear lever spring 134. Thus, FIGS. 8A and 8B illustrate power release mechanism 100 shifted from its Neutral state into a Released state while inside handle release mechanism 200 is maintained in its Disengaged state.

Figure 9A:
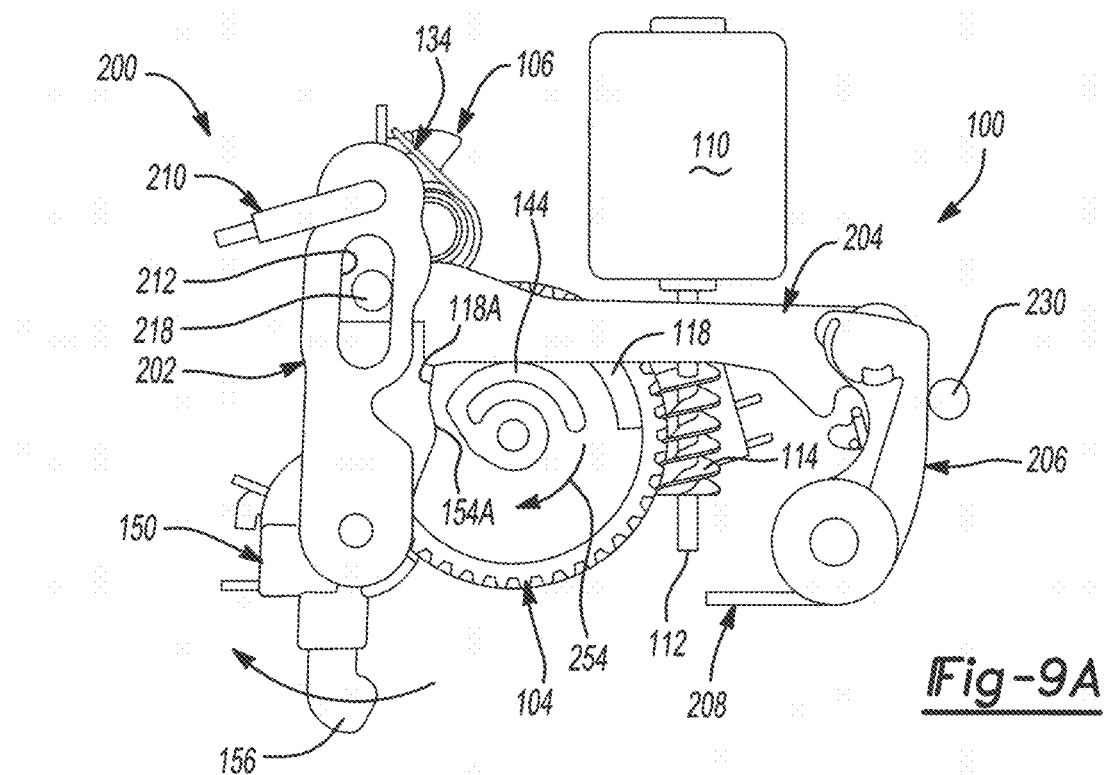
FIGS. 9A and 9B are top and bottom plan views generally similar to FIGS. 8A and 8B, respectively, but now showing the power release mechanism of the closure latch assembly being reset following completion of the power releasing operation.
Figure 9B:
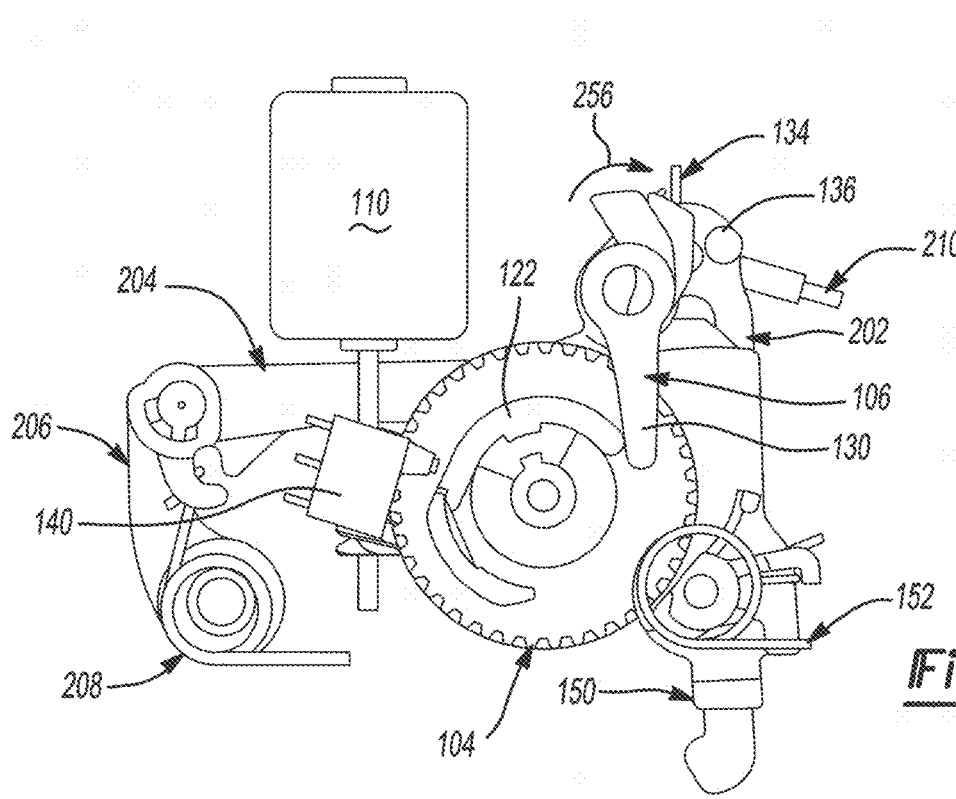
Figure 10A:
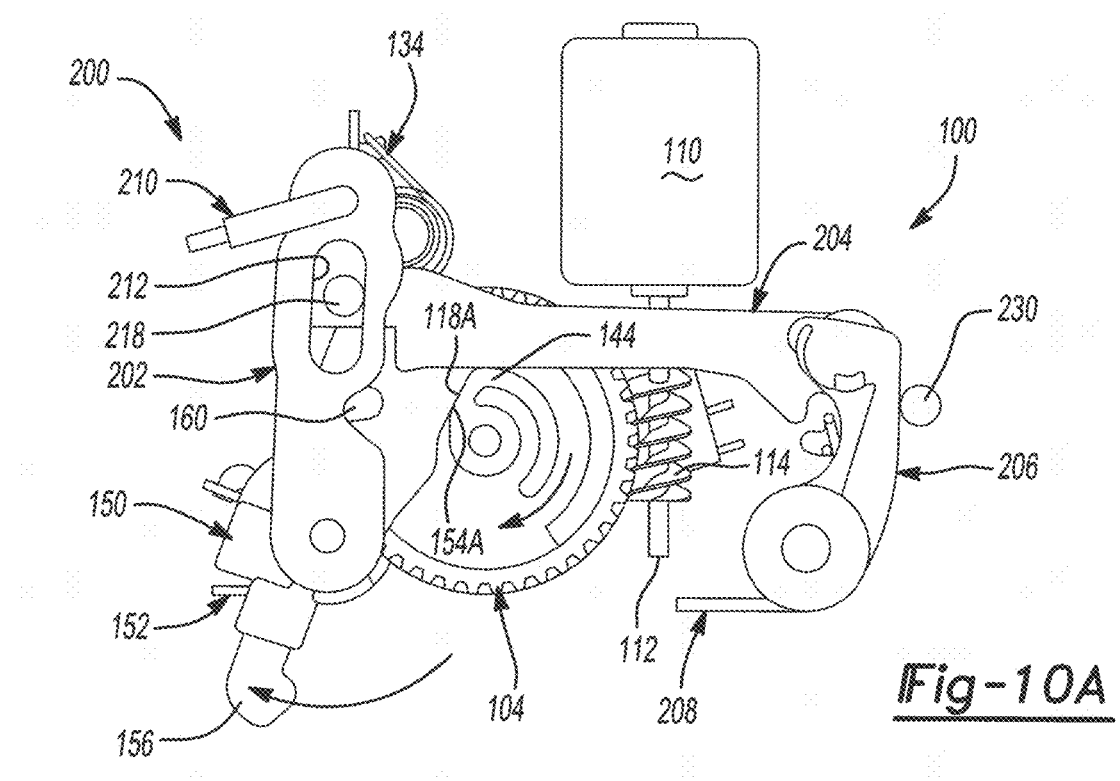
FIGS. 10A and 10B are top and bottom plan views generally similar to FIGS. 9A and 9B, respectively, but now showing completion of the power resetting operation.
Figure 10B:
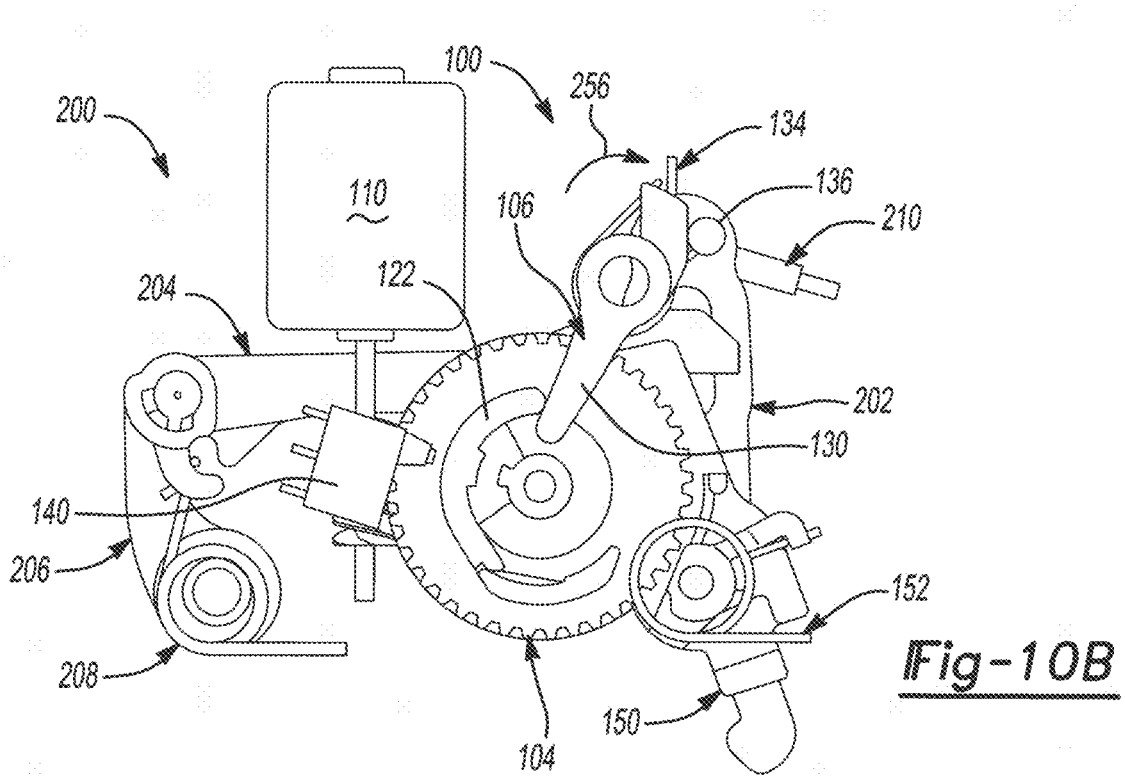

FIGS. 9A and 9B illustrate a subsequent shifting of closure latch assembly 10 from its Power Release mode (FIGS. 8A, 8B) into a Power Reset mode. Specifically, power release motor 110 is reversed in response to ECU 60 receiving the position signal from switch 140 and drives power release gear 104 in a power resetting (i.e., clockwise in FIG. 9A) direction, as indicated by arrow 254, from its released position 302 (FIG. 13) back into its central-home position 300 (FIG. 13) such that the latch assembly is in a home state. Sensor 140 electrically coupled to ECU 60 may provide position information (e.g. "OFF" state) of the power release gear 104 to inform the ECU 60 that the latch assembly is in a home state after a power release. Another or alternative sensor 140 which provides position information (e.g. "ON" signal) when the power release gear 104, or other power release mechanism component for example, is in its reset position may otherwise be provided for indicating the ECU 60 to control the motor in response, and for example stop or cease the power resetting control of the motor. This action allows actuator lever spring 152 to return actuator lever 150 to its non-actuated position while link lever cam 144 continues to hold link lever 204 in its uncoupled position. As best indicated by arrow 256 in FIG. 9B, gear lever spring 134 forcibly rotates gear lever 106 from its loaded position toward its home position, thereby causing drive lug segment 130 to act on gear lever cam 122 and forcibly assist in rotating power release gear 104 back to its central-home position 300. Power release motor 110 is stopped when sensor 140 is released to change status such that spring-loaded gear lever 106 functions to physically return power release gear 104 completely to its central-home position 300 (FIG. 13), as indicated by FIGS. 10A and 10B. Using the sensor 140 coupled to the ECU for detecting such a reset state of the latch assembly such as for example the return of the power release gear 104 to its central-home position can therefore eliminate the use of such a reset spring, or for example the spring-loaded gear lever 106 since the resetting control of the power release gear 104 is precisely controlled by the control of the motor at a slower rate as described herein such that a hard stop position of the power release gear 104 as urged by a resetting spring is not required, and therefore the power operated mechanism is driven to the home state, or reset position by the motor control circuit operating in the second operation or resetting mode without assistance from a spring. Thus, with closure latch assembly 10 shifted into its Power Release mode, power release mechanism 100 is operating in a Resetting state while inside handle release mechanism 200 remains in its Disengaged state.

Figure 11A:
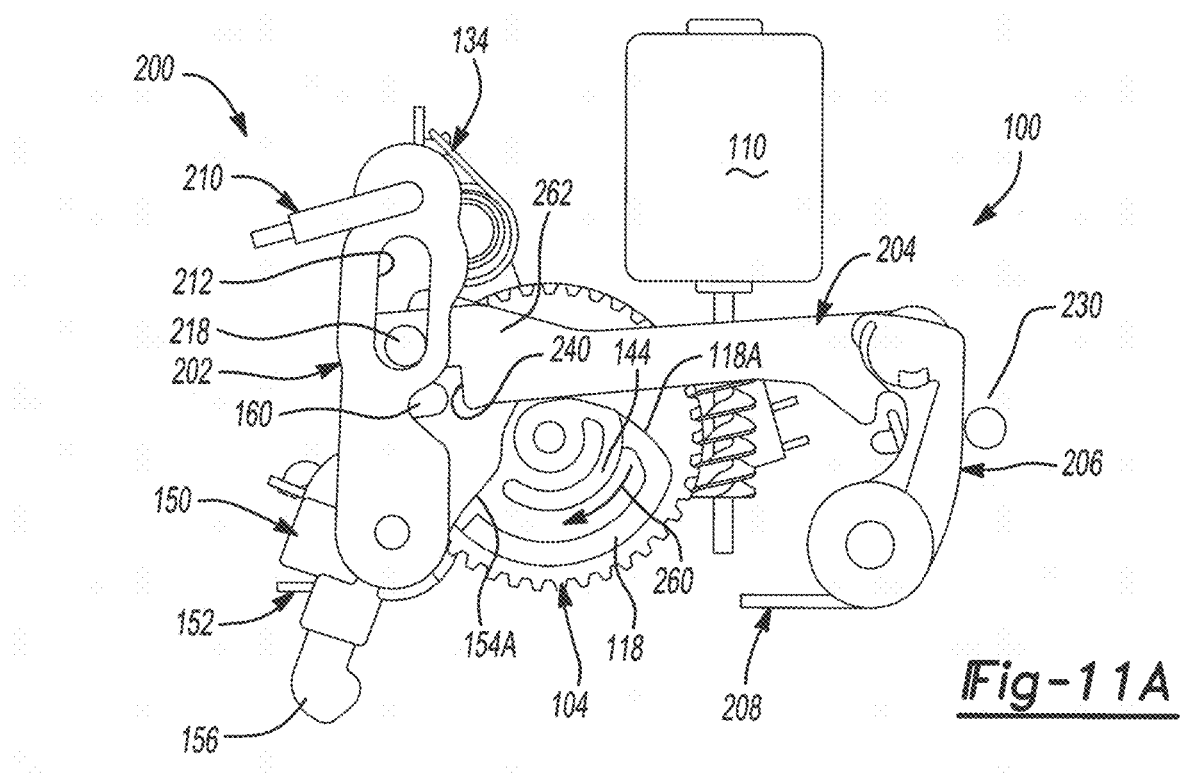
FIGS. 11A and 11B are top and bottom plan views generally similar to FIGS. 6A and 6B, respectively, now showing the closure latch assembly shifted into an Emergency Release mode with the power release mechanism operating in an Unlocked state and the inside handle release mechanism operating in an Engaged state.
Figure 11B:
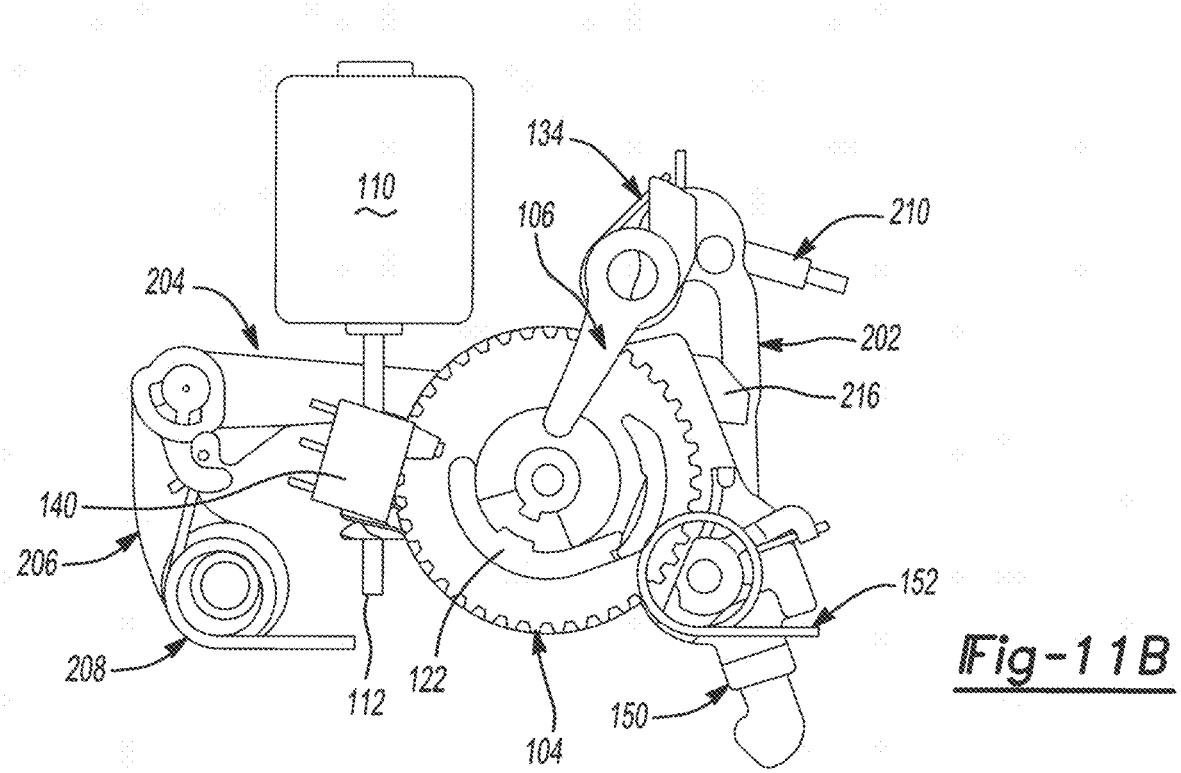

For showing the movement of the components associated with an emergency releasing function, reference is directed to FIGS. 6A and 6B which illustrate closure latch assembly 10 in its Latched mode and FIGS. 11A and 11B which illustrate closure latch assembly 10 now operating in an Emergency Release mode. Specifically, under certain low power and/or emergency situations, an emergency release of the latch mechanism is permitted by ECU 60 initially supplying power release motor 110 with electrical power from a backup power source such as, for example, an internal reserve (e.g., super capacitors). This emergency power is used to cause power release motor 110 to rotate power release gear 104 in an unlocking direction from its central-home position 300 (FIGS. 6A and 13) to its unlocked position 302 (FIG. 13), as indicated by arrow 260. Such rotation of power release gear 104 causes link lever 204 to disengage link lever cam 144 such that link lever 204 is biased by auxiliary lever spring 208 to pivot from its uncoupled position (FIG. 6A) to its coupled position (FIG. 11A). With link lever 204 located in its coupled position, drive lug 160 on actuator lever 150 is aligned with drive notch 240 on link lever 204, as shown in circle 262.

Figure 12A:
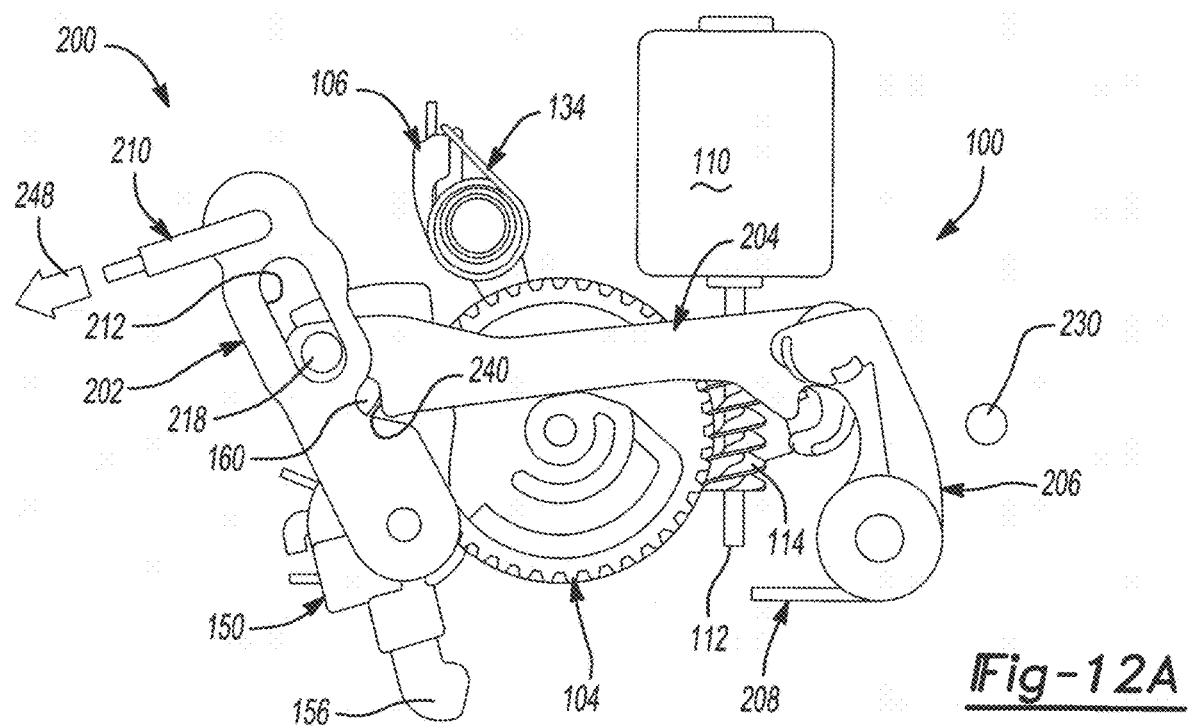
FIGS. 12A and 12B are top and bottom plan views generally similar to FIGS. 11A and 11B, respectively, but now showing actuation of the inside handle causing manual release of the closure latch assembly.
Figure 12B:
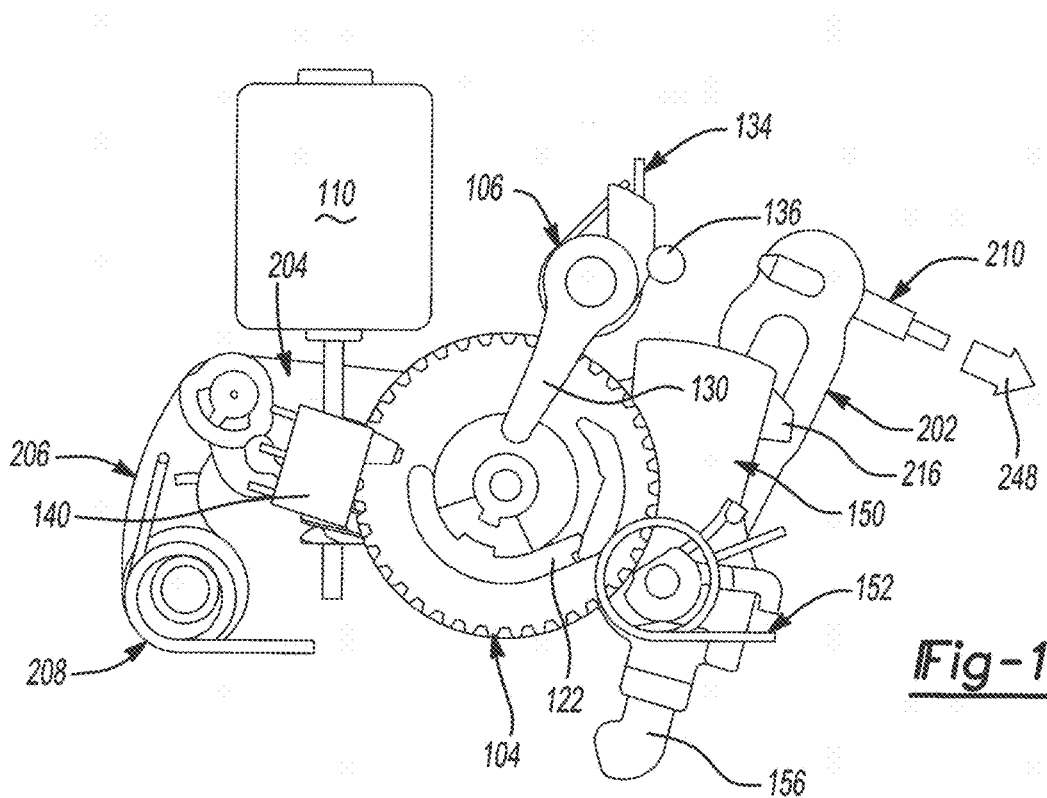

As seen, actuator lever 150 is still located in its non-actuated position and emergency lever 202 is still located in its home position after power release gear 104 has been rotated to it unlocked position 304. As such, power release mechanism 100 is operating in its Unlocked state and inside handle release mechanism 200 is operating in its Engaged state. FIGS. 12A and 12B illustrate that subsequent movement of inside door handle 26 from its rest position to its actuated position causes mechanical movement of emergency lever 202 from its home position into its pulled position. Since link lever 204 is now connected to emergency lever 202, via drive post 218 within guide slot 212 and drive lug 160 being aligned with drive notch 240, such pivotal movement of emergency lever 202 to its pulled position results in concurrent pivotal movement of actuator lever 150 from its non-actuated position into its actuated position. This movement of actuator lever 150 results in manual release of the latch mechanism for shifting closure latch assembly 10 into its Unlatched mode, thereby allowing door 12 to be opened. Closure latch assembly 10 may subsequently be reset manually or electrically by rotating power release gear 104 from its unlocked position 304 back to its central-home position 300 (FIG. 13) after inside door handle 26 has been released and actuator lever 150 has returned to its non-actuated position.

Thus, the present disclosure provides a closure latch assembly 10 configured to normally disconnect/uncouple the inside handle release mechanism 200 from the latch release mechanism utilizing the power release mechanism 100 until a crash or low power situation occurs which requires subsequent connection/coupling of inside handle release mechanism 200 to the latch release mechanism. During normal latch operation, inside latch release mechanism 200 is intentionally disabled/uncoupled to prevent unintended inside latch release operations. The internal power reserve (e.g., onboard batteries, super capacitors, etc.) are only used to enable/couple inside latch release mechanism 200, and particularly a three (3) position power release gear 104 and camming arrangement, is an advancement over otherwise conventional systems. While not limited thereto, specific conditions under which the emergency inside release function is provided include: 1) in event of crash with the vehicle battery disconnected or interrupted; 2) in case of a failed power release operation; 3) in case of the internal energy reserve being under a predetermined minimum reserve power level and the vehicle battery is disconnected; and 4) in the event of a soft closing/cinching operation failure. It will also be understood that actuator lever 150 could be configured to act directly on pawl 32 instead of through the intermediate latch release mechanism in other applications such that movement of actuator lever 150 between its non-actuated and actuated positions causes corresponding movement of pawl 32 between its ratchet holding and ratchet releasing positions.

As discussed above and as shown in FIG. 13, the power release gear 104 of the power release mechanism 100 can move between the "unlocked" position 304, in which the power release motor 110 has a hard stop, the reset or "central-home" position 300, in which the power release motor is stopped by a physical disconnection, and the power release or "released" position 302, in which the power release motor 110 again has a hard stop. So, the power release motor 110 of the power release mechanism 100 is typically driven in both the release direction and the reset direction to complete opening actions of the door 12.

While, in one of the closure latch assemblies 10 described above and shown in FIG. 2, the actuation of the outside door handle 24 is detected and communicated by the switch 28 to the electronic control unit 60 that at least partially controls the operation of closure latch assembly 10, the vehicle 14 may also be equipped with the outside handle 24 mechanically coupled to the closure latch assembly 10 using cables and/or rods. One example of such a mechanically coupled latch assembly is disclosed in U.S. Publication No. 2015/0204118, the entire disclosure of which is herein incorporated by reference. In mechanically coupled latch assemblies, it may be desirable for the outside handle 24 to be disengaged during normal usage and only engaged in case of a vehicle crash. While some solutions may utilize power to move the power release gear 104 from the reset position 300 to the unlock position 304, a return spring may help drive the mechanism 100 back to the reset position 300 in case of a vehicle crash. Nevertheless, such solutions may result in additional noise.

Figure 14:
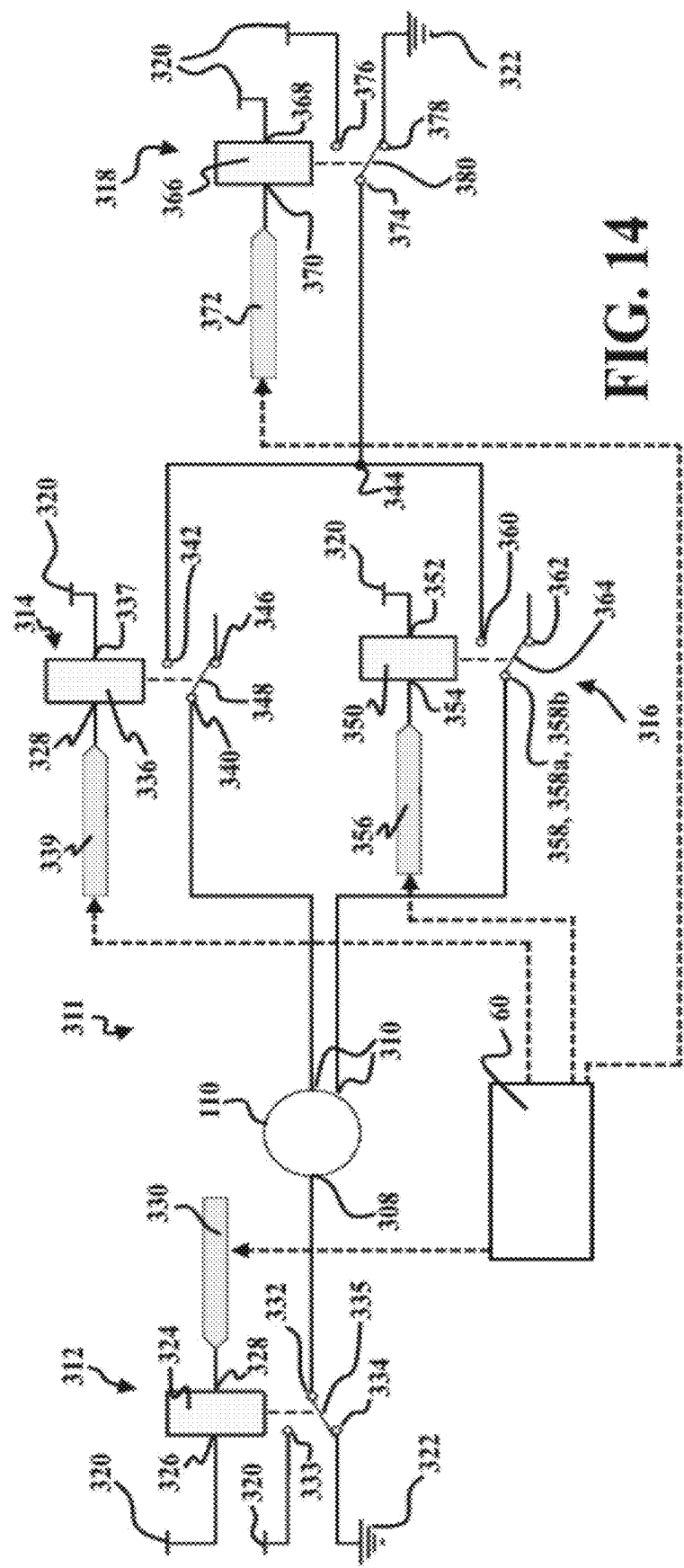
FIG. 14 shows a block diagram of a motor control system of a closure latch system according to aspects of the disclosure.

As best shown in FIG. 14, a motor control system 306 for the power release mechanism 100 of the closure latch assembly 10 is provided. The motor control system 306 includes the power release motor 110 that includes a first motor terminal 308 and a second motor terminal 310. As described above, the power release motor 110 is operatively coupled to the power release gear 104 of the power release mechanism 100. Thus, the closure latch assembly 10 and motor control system 306 form a closure latch system for the vehicle door 12.

The motor control system 306 includes a motor control circuit 311 comprising a plurality of switching units (e.g., relays 312, 314, 316, 318) coupled between one of the first motor terminal 308 and the second motor terminal 310 and one of a voltage supply 320 and an electrical ground 322 to provide one of a first motor current flow and a second motor current flow. The motor control system 306 may include controlling selective application of a voltage source through modulation of a duty cycle of the voltage supplied to the motor, for example through pulse width modulation techniques such that the percentage of time the motor is in the powered state, or in other words receiving power supply from the voltage source, is greater than the percentage of time the motor is in the unpowered state, or in other words not receiving power supply from the voltage source so as to control the resetting speed of the motor at a reduced rate compared to another mode of the motor, such as a power release mode. The motor control system 306 may also be implemented as a Field Oriented Control based system in the configuration where the motor is a brushless motor for driving the so as to control the resetting speed of the brushless motor at a reduced rate compared to another mode of the brushless motor. In more detail, the first motor current flow is from the voltage supply 320 to the first motor terminal 308 and through the second motor terminal 310 to the electrical ground 322 to drive the power release motor 110 in the first direction (e.g., the power release direction or unlock resetting direction) formed by a first electrical circuit path 313 established by control of the plurality of relays in a manner which will be exemplified in more details below. The second motor current flow is from the voltage supply 320 to the second motor terminal 310 through the first motor terminal 308 to the electrical ground 322 to drive the power release motor 110 in the second direction (e.g., the unlocking direction or the power resetting direction) opposite the first direction formed by a second electrical circuit path 315 established by control of the plurality of relays in a manner which will also be exemplified in more details below. More specifically, driving the power release motor 110 in the first direction moves the power release gear 104 from its unlocked position 304 to its released position 302 and from its central-home position 300 to its released position 302. Driving the power release motor 110 in the second direction moves the power release gear 104 from its released position 302 to its central-home position 300 and from its central-home position 300 to its unlock position 304. Again, while the switching units are shown as electromagnet relays 312, 314, 316, 318, it should be understood that the switching units could instead be solid state switches or relays, such as but not limited to Field Effect Transistors (FETs). It should also be appreciated that the second motor current flow could instead drive the power release motor 110 in the same direction as the first direction, yet at a different speed (e.g., driven slower, or at a lower speed, after being driven in the power release or unlock direction). Driving a latch assembly motor in a resetting direction at a reduced speed may reduce an operating sound level, or volume, of the closure latch assembly, or of a remote actuator controlled using the teachings described herein, of at least one of the motor and the power release mechanism such as caused by hard stops of the gears or levers against other components or latch housing bumper(s) upon reaching of the reset position or state, or due to the winding or winding of a spring(s) acting upon a component of the power release mechanism during the resetting action. So, according to an aspect, the second direction can be in the same direction as the first direction. In another example, the second direction can be in a different direction, or in an opposite direction to the first direction.

The electronic control unit 60 is coupled to the plurality of switching units (e.g., relays 312, 314, 316, 318) and is configured to control the power release motor 110 by commanding the plurality of switching units to provide the first motor current flow in a first operation mode and the second motor current flow in a second operation mode. Specifically, the first operation mode can include one of the power release mode and a release mode (e.g., Unlatched mode of the closure latch assembly 10) and the second operation mode can include one of a reset mode (e.g., the power reset mode of the closure latch assembly 10) and an unlock mode (e.g., emergency release mode of the closure latch assembly 10). While the electronic control unit 60 is disclosed as commanding the plurality of relays 312, 314, 316, 318, it should be appreciated that a different controller (e.g., separate from electronic control unit 60) may instead be utilized. The plurality of relays 312, 314, 316, 318 could, for example, be located in a body control module in communication with the closure latch assembly 10; however, it should be understood that the plurality of relays 312, 314, 316, 318 could be disposed elsewhere. In addition, while the plurality of switching units are relays 312, 314, 316, 318 and are each shown as single pole dual throw relays, it should be appreciated that other types of relays or other types of switching units (e.g., transistors) may alternatively or additionally be utilized.

The plurality of relays 312, 314, 316, 318 includes a release relay 312. The release relay 312 is coupled to the voltage supply 320 and the electrical ground 322 and to the first motor terminal 308 of the power release motor 110 to provide a selectable release current flow (selectable based on operation of the release relay 312, described below) from the voltage supply 320 to the first motor terminal 308 and from the first motor terminal 308 to the electrical ground 322. The release relay 312 has a release coil 324 including a release coil positive terminal 326 coupled to the voltage supply 320 and a release coil negative terminal 328 coupled to a release drive node 330 that is coupled to the electronic control unit 60. The release relay 312 includes a common release contact 332 coupled to the first motor terminal 308 and a first release contact 333 coupled to the voltage supply 320 and a second release contact 334 coupled to the electrical ground 322. A release armature 335 is rotatably and electrically coupled the common release contact 332 and is movable between engaging the first release contact 333 and the second release contact 334 in response to a release coil current flow through the release coil 324 to provide the selectable release current flow from the voltage supply 320 through a first electrical circuit path 313 and therefore to the first motor terminal 308 of the power release motor 110 and from the first motor terminal 308 of the power release motor 110 to the electrical ground 322 based on one of the release drive node 330 being electrically grounded and the release drive node 330 not being grounded. In other words, the electronic control unit 60 can pull the release drive node 330 low to energize the release coil 324 and move the release armature 335 to provide the selectable release current flow.

The plurality of relays 312, 314, 316, 318 also includes an unlock relay 314. The unlock relay 314 has an unlock coil 336 including an unlock coil positive terminal 337 coupled to the voltage supply 320 and an unlock coil negative terminal 338 coupled to an unlock drive node 339 that is coupled to the electronic control unit 60. The unlock relay 314 also includes a common unlock contact 340 coupled to the second motor terminal 310 and a first unlock contact 342 coupled to a branch node 344 and a second unlock contact 346. An unlock armature 348 is rotatably and electrically coupled the common unlock contact 340 and is movable between engaging the first unlock contact 342 and the second unlock contact 346 in response to an unlock coil current flow through the unlock coil 336 to provide a selectable unlock current flow (selectable based on operation of the unlock relay 314) between the branch node 344 and the second motor terminal 310 of the power release motor 110 based on one of the unlock drive node 339 being electrically grounded (e.g., pulled low by the electronic control unit 60) and the unlock drive node 339 not being grounded. So, the unlock relay 314 is coupled to the voltage supply 320 and to the branch node 344 and to the second motor terminal 310 of the power release motor 110 to provide the selectable unlock current flow between the branch node 344 and the second motor terminal 310 and from the second motor terminal 310 to the branch node 344.

The plurality of relays 312, 314, 316, 318 additionally includes a reset relay 316. The reset relay 316 is coupled to the voltage supply 320 and to the branch node 344 and to the second motor terminal 310 of the power release motor 110 to provide a selectable reset current flow (selectable based on operation of the reset relay 316, described below) between the second motor terminal 310 and the branch node 344. The reset relay 316 has a reset coil 350 including a reset coil positive terminal 352 coupled to the voltage supply 320 and a reset coil negative terminal 354 coupled to a reset drive node 356 that is coupled to the electronic control unit 60. The reset relay 316 includes a common reset contact 358, 358a, 358b coupled to the second motor terminal 310 and a first reset contact 360 coupled to the branch node 344 and a second reset contact 362. A reset armature 364 is rotatably and electrically coupled the common reset contact 358, 358a, 358b and is movable between engaging the first reset contact 360 and the second reset contact 362 in response to a reset coil current flow through the reset coil 350 to provide the selectable reset current flow between the branch node 344 and the second motor terminal 310 of the power release motor 110 based on one of the reset drive node 356 being electrically grounded (e.g., pulled low by the electronic control unit 60) and the reset drive node 356 not being grounded.

The plurality of relays 312, 314, 316, 318 includes a power control relay 318. The power control relay 318 is coupled to the voltage supply 320 and the electrical ground 322 and to the branch node 344 to provide a selectable power control current flow (selectable based on operation of the power control relay 318, described below) from the voltage supply 320 to the branch node 344 and from the branch node 344 to the electrical ground 322. The power control relay 318 has a power control coil 366 including a power control coil positive terminal 368 coupled to the voltage supply 320 and a power control coil negative terminal 370 coupled to a power control node 372 that is coupled to the electronic control unit 60. The power control relay 318 includes a common power control contact 374 coupled to the branch node 344 and a first power control contact 376 coupled to the voltage supply 320 and a second power control contact 378 coupled to the electrical ground 322 and a power control armature 380 being rotatably and electrically coupled to the common power control contact 374 and is movable between engaging the first power control contact 376 and the second power control contact 378 in response to a power control coil current flow through the power control coil 366 to provide a selectable power control current flow between the voltage supply 320 to the branch node 344 and between the branch node 344 and the electrical ground 322 based on one of the power control node 372 being electrically grounded (e.g., pulled low by the electronic control unit 60) and the power control node 372 not being grounded.

Figures 15A, 16:
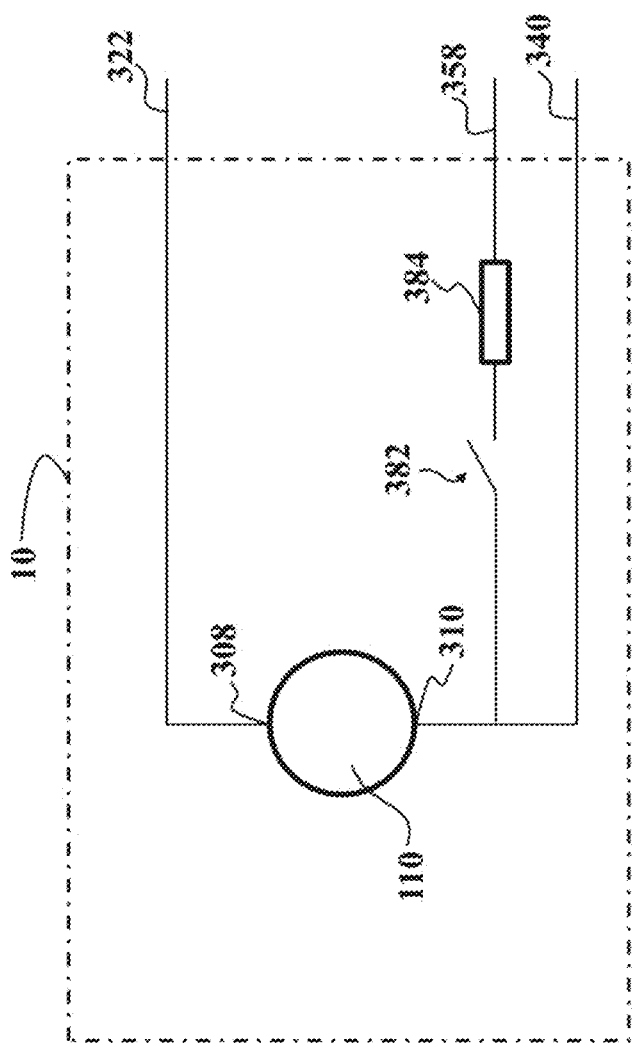
FIGS. 15A-15C show a reset switch and a reset resistor used as a part of the motor control system of FIG. 14 according to aspects of the disclosure.
FIG. 16 is a table illustrating the status of the reset switch of FIGS. 15A-15C for various corresponding positions of the power release motor and power release gear.

As best shown in FIG. 15A, the motor control system 306 can further include a reset switch 382 coupled to the second motor terminal 310 and movable between a reset connected position for connecting the power release motor 110 to the common reset contact 358, 358a, 358b of the reset relay 316 and a reset disconnected position for disconnecting the power release motor 110 from the common reset contact 358, 358a, 358b of the reset relay 316. The reset switch 382 can cut off or interrupt power to the power release motor 110 at the reset or "central-home" position 300 to stop the power release motor 110. Also, the reset switch 382 can indicate the lock/unlock status of the outside handle 24. As best shown in FIG. 16, a table illustrates the status of the reset switch 382 for various corresponding positions of the power release motor 110 and power release gear 104. The table cells represent Motor and Gear Position 990, Unlocked 992, Reset 994, Released 996 headings and corresponding values of Reset SW (switch) status 991, Open 993, Open 995, and Closed 997. The reset switch 382 could indicate the lock/unlock status of the outside release or door handle 24 (FIG. 1).

Referring back to FIG. 15A, the motor control system 306 can further include a reset resistor 384 connected in series between the reset switch 382 and the reset relay 316 for reducing the selectable reset current flow between the branch node 344 and the second motor terminal 310 and through the reset switch 382 (when the reset switch 382 is in its reset connected position). Consequently, the reset resistor 384 reduces a speed of the power release motor 110 in the reset mode and thus, noise associated with the reset mode is reduced.

Figure 15B:
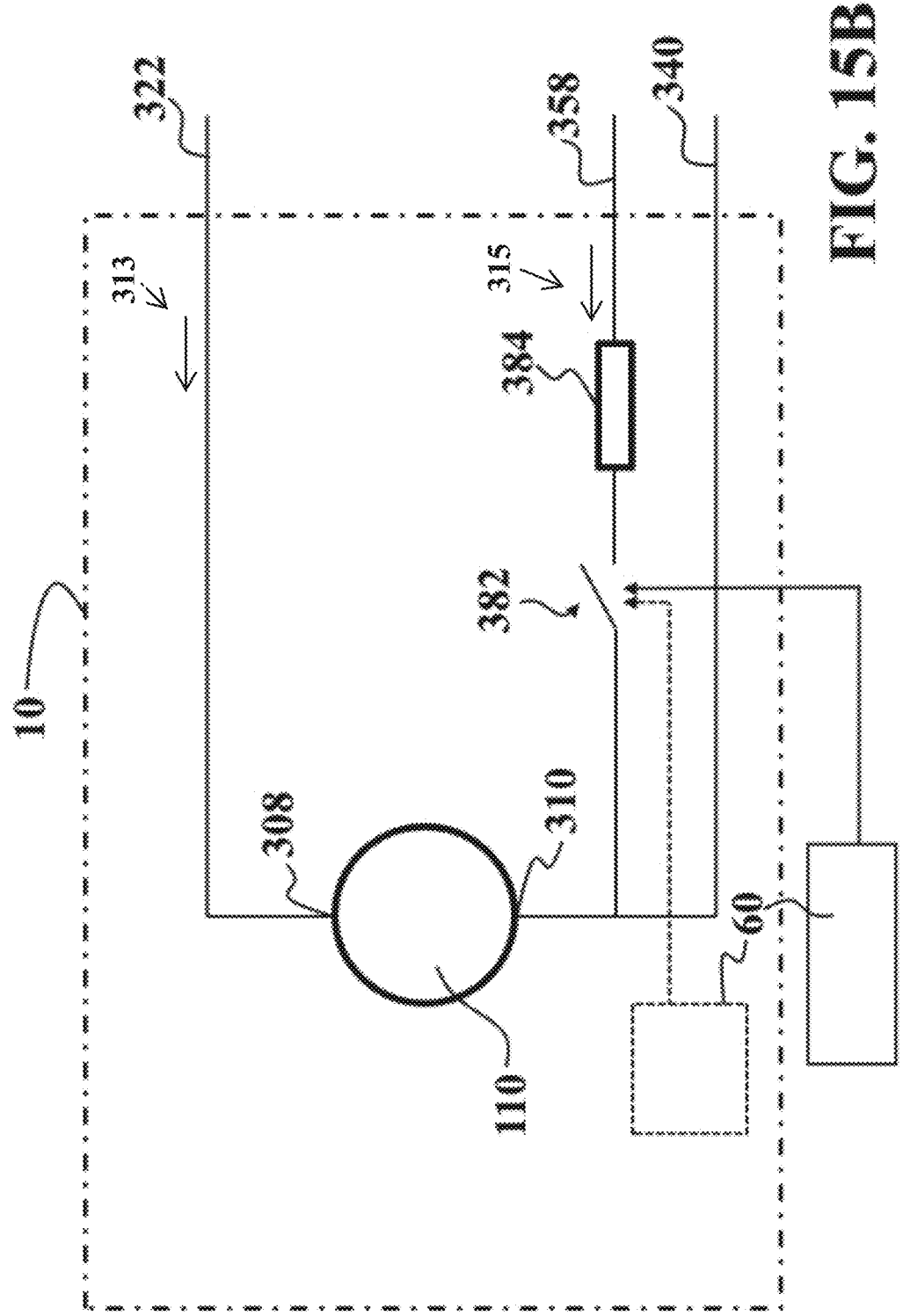
Figure 15C:
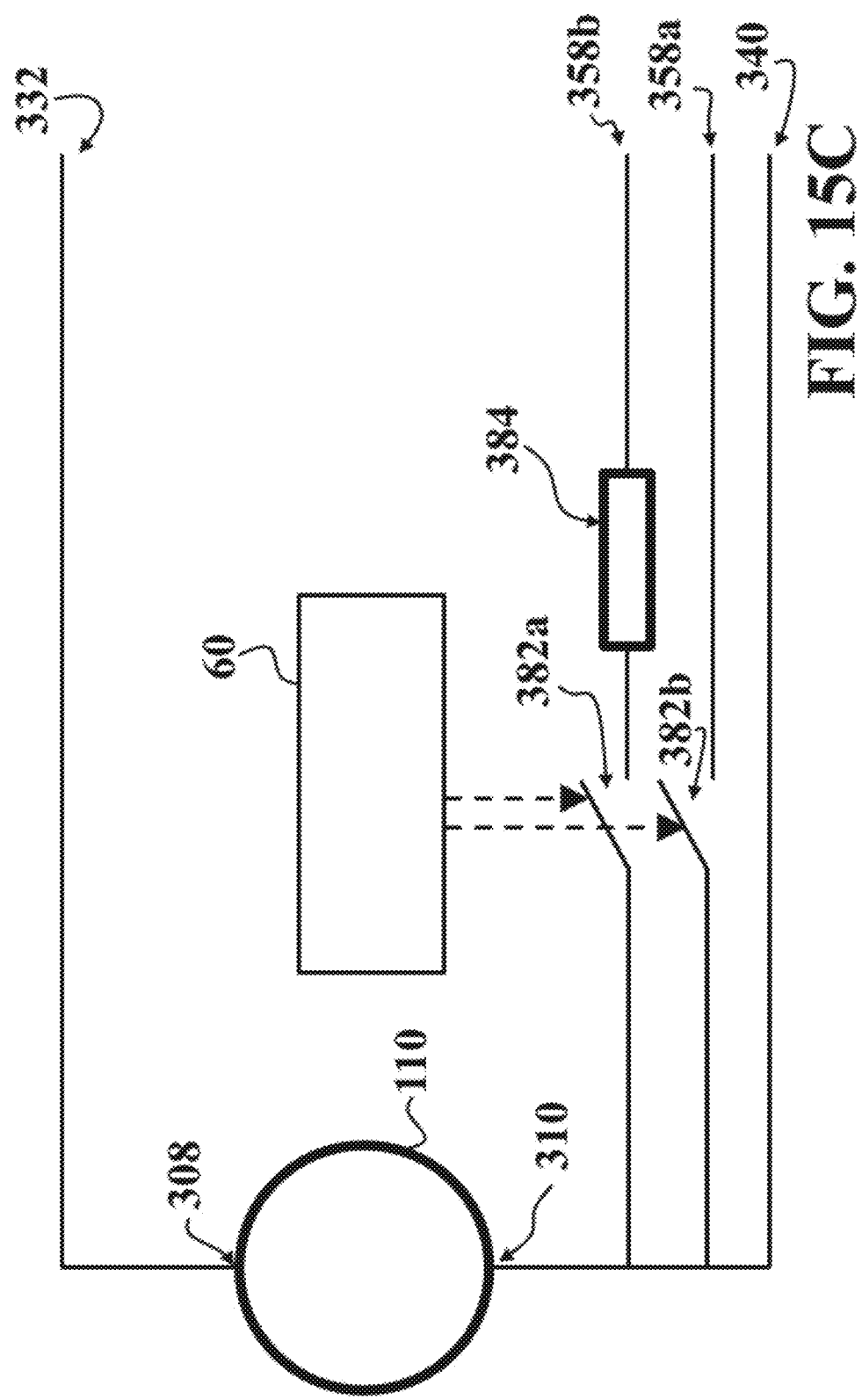
Figure 21:
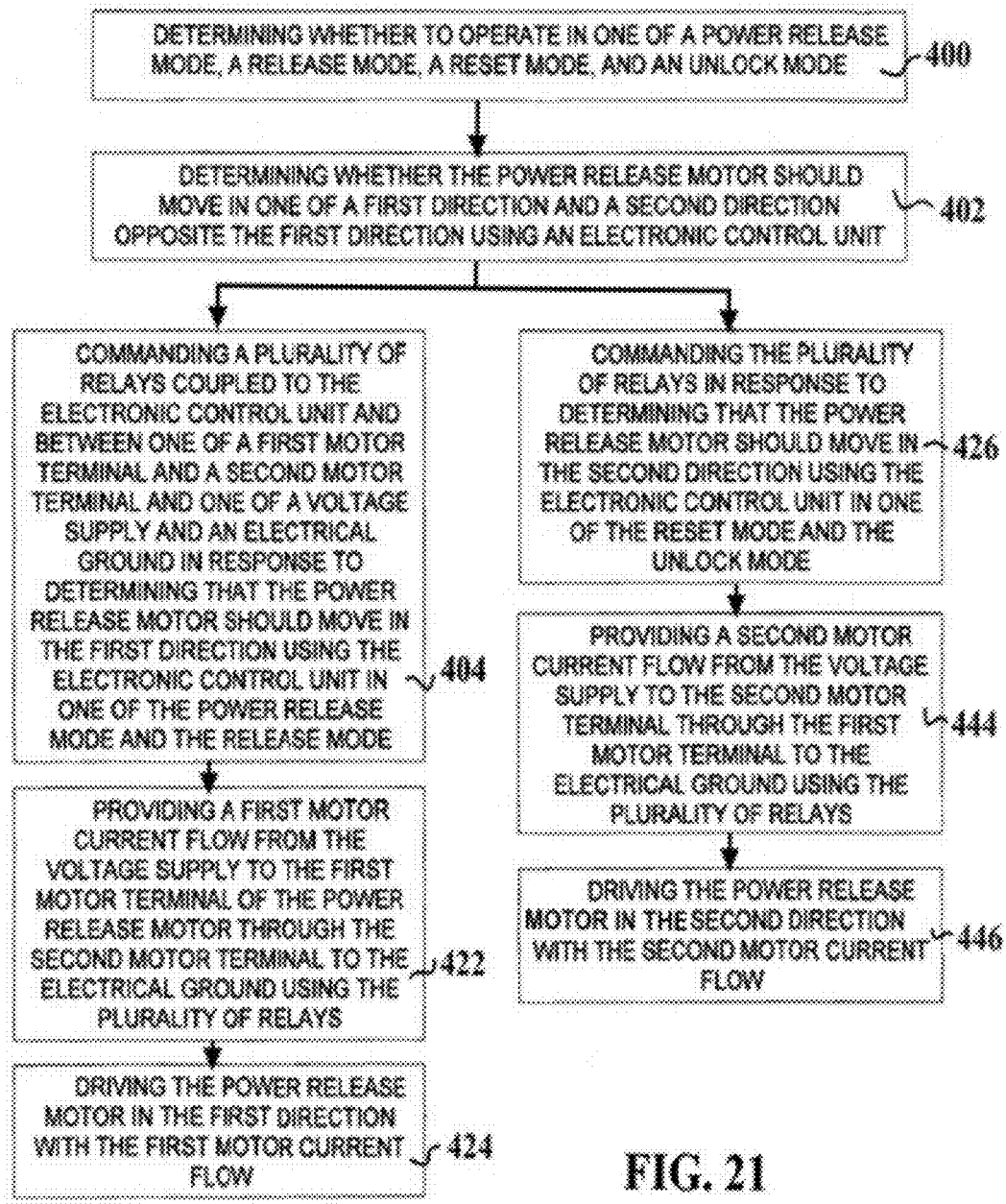
Figure 22A:
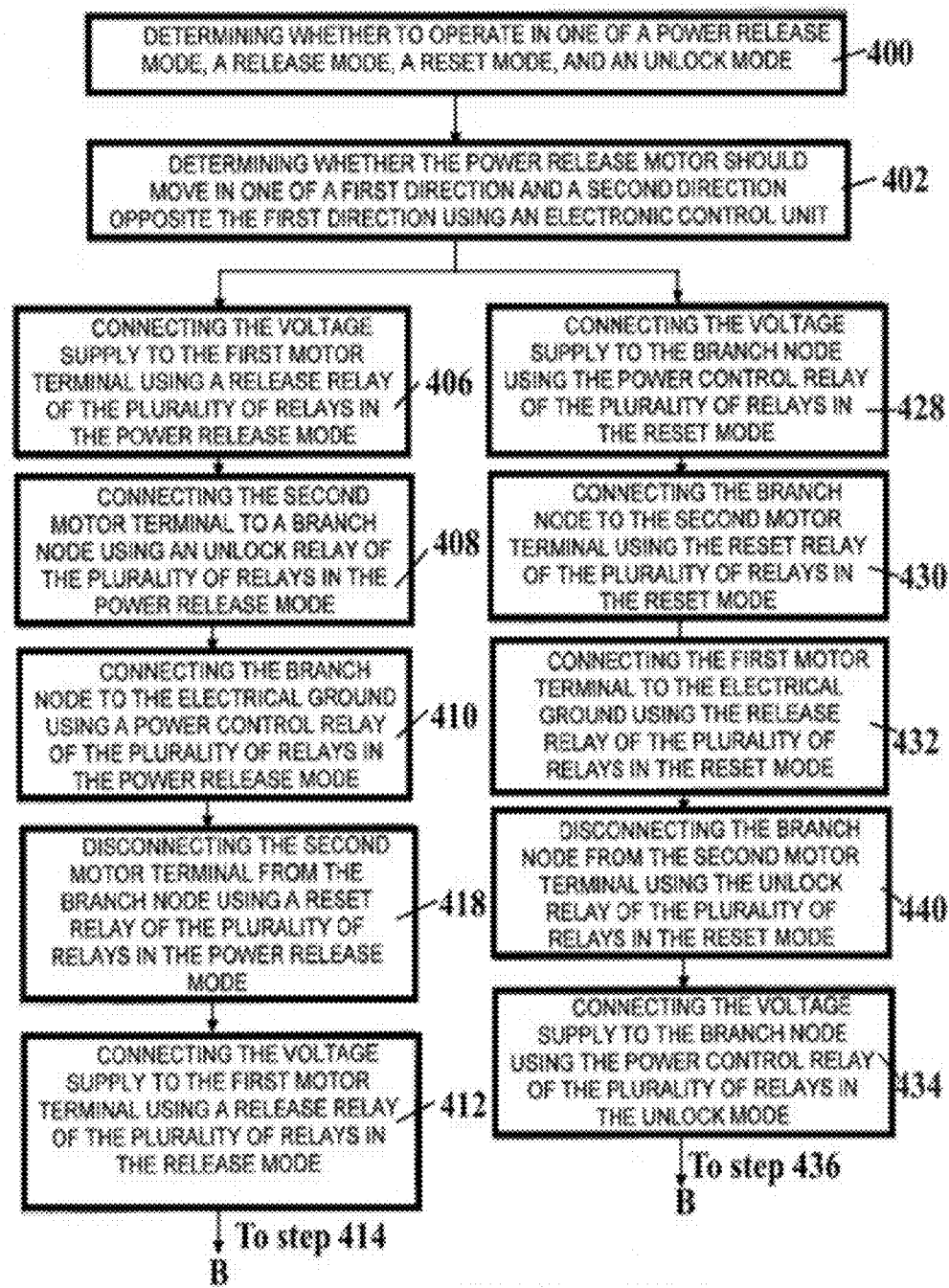
Figure 22B:
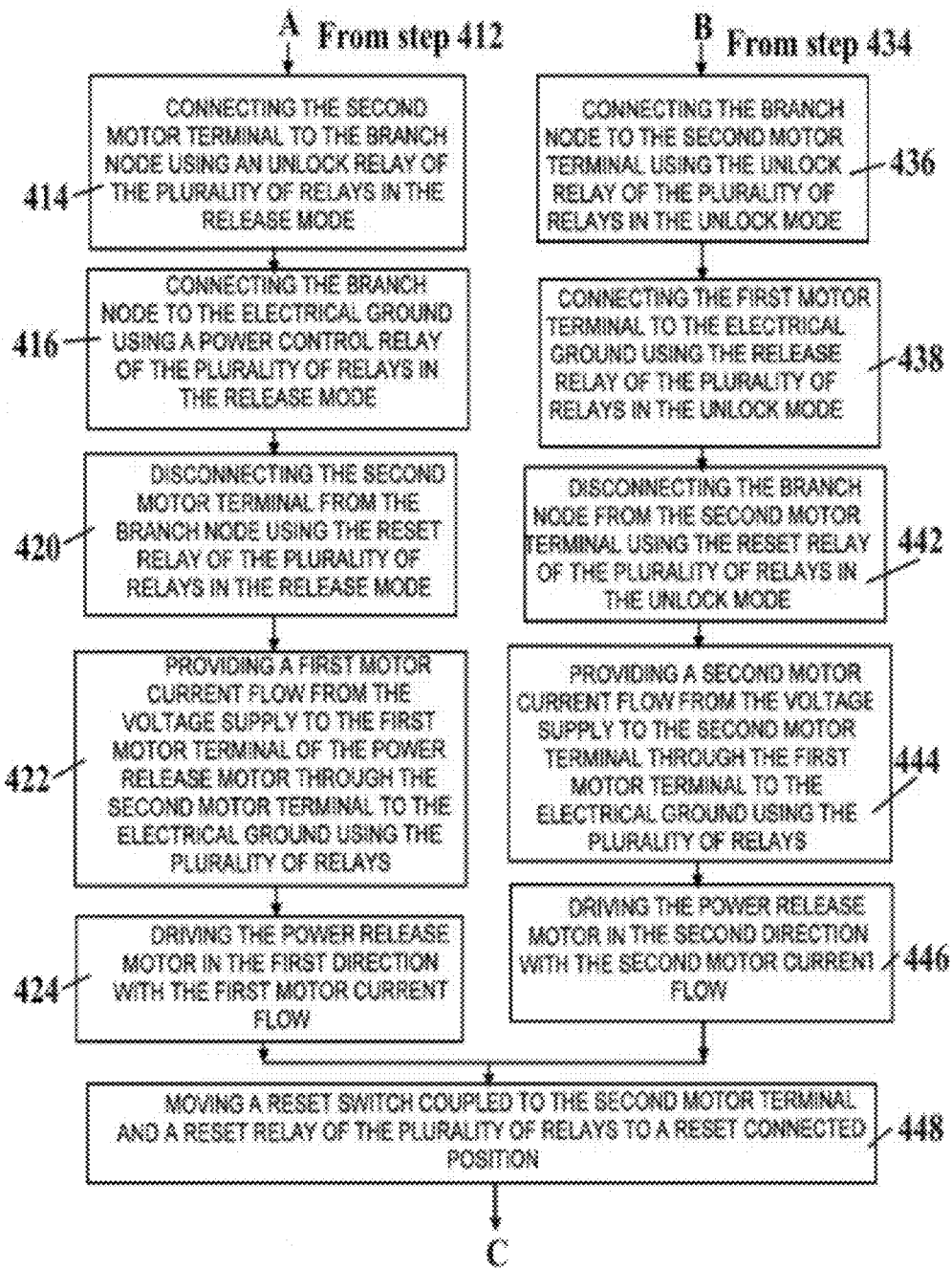

Referring to FIG. 15B, the ECU 60 can be coupled with the reset switch 382, so as to control the selection of the state of the switch 382 (e.g. closed or open). Referring to FIG. 15C, the ECU 60 can be coupled with the reset switch 382a and switch 382b so as to control the introduction of the reset resistor 384 into the circuit 315, an example of a second electrical circuit path established by control of the plurality of relays, the during a power reset mode. For example, if reset resistor 384 is desired to be in series with the reset circuit (e.g., the common reset contact 358a, 358b of the reset relay 316) to reduce the speed of the power release motor 110, the state of the switch 382b is set by the electronic control unit 60 to open while the state of switch 382a is set to close by the electronic control unit 60. So, the introduction of the reset resistor 384 into the circuit 311, and for example into the second electrical circuit path 315 (e.g., during a power reset mode) by the reset switch 328, 382a reduces a magnitude of the second motor current flow to be less than a magnitude of the first motor current flow, and generally the electrical circuit path supplying a power resetting current to the motor, and for example the second electrical circuit path 315, has an electrical resistance greater than the electrical resistance of another electrical circuit path, such as the first electrical path 313, supplying a power releasing current to the motor, such that the second motor current flow is less than the first motor current flow. Such a reduction of the magnitude of the second motor current flow results in a slower speed of the power release motor 110. If reset resistor 384 is not desired to be in series with the reset circuit to reduce the speed of the power release motor 110, the state of the switch 382b is set by the electronic control unit 60 to closed while the state of switch 382a is set to open by the electronic control unit 60. Thus, the switch 382b can provide an open circuit state (i.e., to allow current flow through the reset resistor 384) or a closed circuit state (to bypass the reset resistor 384).

FIGS. 17A-20B illustrate the positions of each of the armatures 338, 348, 364, 380 of the plurality of relays 312, 314, 316, 318 and corresponding current flow through the motor control circuit 311 of the motor control system 306 for each of the movements of the power release motor 110 and power release gear 104 in each of the power release mode, the reset mode, the release mode and the unlock mode. Specifically, FIG. 17B shows the first motor current flow in the power release mode corresponding to movement of the power release gear 104, shown in FIG. 17A, from the reset position 300 to the release position 302. FIG. 18B shows the second motor current flow in the reset mode corresponding to movement of the power release gear 104, shown in FIG. 18A, from the release position 302 to the reset position 300. FIG. 19B shows the second motor current flow in the unlock mode corresponding to movement of the power release gear 104, shown in FIG. 19A, from the reset position 300 to the unlock position 304. FIG. 20B shows the first motor current flow in the release mode corresponding to movement of the power release gear 104, shown in FIG. 20A, from the unlock position 304 to the release position 302.

It is recognized that the power release motor 110 can be operated in various combinations and sub-combinations of modes, such as one of a power release mode where the power release motor 110 is driven in a first direction, and a reset mode where the power release motor 110 is driven in a second direction, such as in a opposite direction to the first direction or in the same direction as the first direction, where a speed and noise reduction results from control of the power release motor 110 in a manner to reduce the driven speed of the power release motor (e.g., the second motor current flow being less in magnitude than the first motor current flow) in the second direction which is lower than the driven speed of the power release motor 110 in the first direction (e.g., due to the first motor current flow having a higher amperage than the second motor current flow).

As best shown in FIGS. 21 and 22A-22C, a method of controlling the power release motor 110 of the power release mechanism 100 of the closure latch assembly 10 is also provided. The method of controlling a motor of a closure latch assembly, such as a power release motor of a power release mechanism of a closure latch assembly, illustratively includes the steps of supplying the power release motor with at least one of a first motor current flow and a first motor voltage to drive the power release motor with a first speed in a first operation mode, and supplying the power release motor with at least one of a second motor current flow and a second motor voltage to drive the power release motor with a second speed different than the first speed in a second operation mode.

The method includes the step of 400 determining whether to operate in one of a power release mode (FIGS. 17A-17B), a release mode (FIGS. 20A-20B), a reset mode (FIGS. 18A-18B), and an unlock mode (FIGS. 19A-19B). The method continues by 402 determining whether the power release motor 110 should move in one of a first direction and a second direction (e.g., opposite the first direction) using an electronic control unit 60.

The method proceeds with the step of 404 commanding a plurality of relays 312, 314, 316, 318 coupled to the electronic control unit 60 and between one of a first motor terminal 308 and a second motor terminal 310 and one of a voltage supply 320 and an electrical ground 322 in response to determining that the power release motor 110 should move in the first direction using the electronic control unit 60 in one of the power release mode and the release mode. Specifically, the step of 404 commanding a plurality of relays 312, 314, 316, 318 coupled to the electronic control unit 60 and between one of the first motor terminal 308 and the second motor terminal 310 and one of the voltage supply 320 and the electrical ground 322 in response to determining that the power release motor 110 should move in the first direction using the electronic control unit 60 in one of the power release mode and the release mode can include the steps of 406 connecting the voltage supply 320 to the first motor terminal 308 using a release relay 312 of the plurality of relays 312, 314, 316, 318 in the power release mode (FIGS. 17A-17B) and 408 connecting the second motor terminal 310 to a branch node 344 using an unlock relay 314 of the plurality of relays 312, 314, 316, 318 in the power release mode. Next, 410 connecting the branch node 344 to the electrical ground 322 using a power control relay 318 of the plurality of relays 312, 314, 316, 318 in the power release mode and 412 connecting the voltage supply 320 to the first motor terminal 308 using a release relay 312 of the plurality of relays 312, 314, 316, 318 in the release mode (FIGS. 20A-20B). The method can also include the steps of 414 connecting the second motor terminal 310 to the branch node 344 using an unlock relay 314 of the plurality of relays 312, 314, 316, 318 in the release mode and 416 connecting the branch node 344 to the electrical ground 322 using a power control relay 318 of the plurality of relays 312, 314, 316, 318 in the release mode. The method can additionally include the steps of 418 disconnecting the second motor terminal 310 from the branch node 344 using a reset relay 316 of the plurality of relays in the power release mode and 420 disconnecting the second motor terminal 310 from the branch node 344 using the reset relay 316 of the plurality of relays 312, 314, 316, 318 in the release mode.

Next, the method includes the step of 422 providing a first motor current flow from the voltage supply 320 to the first motor terminal 308 of the power release motor 110 through the second motor terminal 310 to the electrical ground using the plurality of relays 312, 314, 316, 318. The method also includes the step of 424 driving the power release motor 110 in the first direction with the first motor current flow.

Then, the method continues by 426 commanding the plurality of relays 312, 314, 316, 318 in response to determining that the power release motor 110 should move in the second direction using the electronic control unit 60 in one of the reset mode and the unlock mode. In more detail, the step of 426 commanding the plurality of relays 312, 314, 316, 318 in response to determining that the power release motor 110 should move in the second direction using the electronic control unit 60 in one of the reset mode and the unlock mode can include the steps of 428 connecting the voltage supply 320 to the branch node 344 using the power control relay 318 of the plurality of relays 312, 314, 316, 318 in the reset mode (FIGS. 18A-18B) and 430 connecting the branch node 344 to the second motor terminal 310 using the reset relay 316 of the plurality of relays 312, 314, 316, 318 in the reset mode. The method can also include the steps of 432 connecting the first motor terminal 308 to the electrical ground 322 using the release relay 312 of the plurality of relays 312, 314, 316, 318 in the reset mode and 434 connecting the voltage supply 320 to the branch node 344 using the power control relay 318 of the plurality of relays 312, 314, 316, 318 in the unlock mode. Next, 436 connecting the branch node 344 to the second motor terminal 310 using the unlock relay 314 of the plurality of relays 312, 314, 316, 318 in the unlock mode and 438 connecting the first motor terminal 308 to the electrical ground 322 using the release relay 312 of the plurality of relays 312, 314, 316, 318 in the unlock mode (FIGS. 19A-19B). The method can additionally include the steps of 440 disconnecting the branch node 344 from the second motor terminal 310 using the unlock relay 314 of the plurality of relays 312, 314, 316, 318 in the reset mode and 442 disconnecting the branch node 344 from the second motor terminal 310 using the reset relay 316 of the plurality of relays 312, 314, 316, 318 in the unlock mode.

The next step of the method is 444 providing a second motor current flow from the voltage supply 320 to the second motor terminal 310 through the first motor terminal 308 to the electrical ground 322 using the plurality of relays 312, 314, 316, 318. The method continues with the step of 446 driving the power release motor 110 in a second direction with the second motor current flow.

The method can further include the step of 448 moving a reset switch 382 coupled to the second motor terminal 310 and a reset relay 316 of the plurality of relays 312, 314, 316, 318 to a reset connected position. The method can also include the step of 450 connecting the power release motor 110 to a common reset contact 358, 358a, 358b of the reset relay 316 in response to moving the reset switch 382 to the reset connected position. Next, 452 moving the reset switch 382 coupled to the second motor terminal 310 and the reset relay 316 of the plurality of relays 312, 314, 316, 318 to a reset disconnected position. The method can then include the step of 454 disconnecting the power release motor 110 from the common reset contact 358, 358a, 358b of the reset relay 316 in response to moving the reset switch 382 to the reset disconnected position. The method can also include the step of 456 reducing a selectable reset current flow between the branch node 344 and the second motor terminal 310 and through the reset switch 382 using a reset resistor 384 connected in series between the reset switch 382 and the reset relay 316.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the scope of the subject invention as defined in the appended claims.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A motor control system for a power operated mechanism of a closure latch assembly, comprising:
    a motor including a first motor terminal and a second motor terminal and operatively coupled to the power operated mechanism; and
    a motor control circuit coupled between one of the first motor terminal and the second motor terminal and one of a voltage supply and an electrical ground to control a power supply to the motor and drive the motor in a first direction and in a second direction;
    wherein the motor control circuit is configured to control the motor by providing the power supply in a first operation mode to drive the motor in the first direction and in a second operation mode to drive the motor in the second direction, wherein a speed of the motor when driven in the first operation mode is different than the speed of the motor when driven in the second operation mode and the power operated mechanism is driven without assistance from a spring when the motor control circuit is in the second operation mode to reset the closure latch assembly.

2. The motor control system as set forth in claim 1, wherein the power operated mechanism is a power release mechanism, and the motor is a power release motor operatively coupled to a power release gear of the power release mechanism.

3. The motor control system as set forth in claim 2, wherein the first operation mode is a power release mode and the second operation mode is a reset mode, wherein the speed of the power release motor when driven in the reset mode is lower than the speed of the power release motor when driven in the power release mode to reduce an operating sound level of at least one of the motor and the power release mechanism.

4. The motor control system as set forth in claim 1, wherein the motor control circuit is configured in the first operation mode to supply a first motor current flow to drive the motor in the first direction through a first electrical circuit path established between one of the first motor terminal and the second motor terminal and one of a voltage supply and the electrical ground, and the motor control circuit is configured in the second operation mode to supply a second motor current flow to drive the motor in the second direction through a second electrical circuit path established between one of the first motor terminal and the second motor terminal and one of a voltage supply and the electrical ground, wherein the second electrical circuit path has an electrical resistance greater than the electrical resistance of the first electrical circuit path such that the second motor current flow is less than the first motor current flow.

5. The motor control system as set forth in claim 4, further comprising a reset resistor provided in series with the second electrical circuit path for reducing the second motor current flow to a reset current flow.

6. The motor control system as set forth in claim 5, further including a reset switch provided in series with the second electrical circuit path and movable between a reset connected position for allowing the second motor current flow through the second electrical circuit path and a reset disconnected position for preventing the second motor current flow through the second electrical circuit path, wherein the reset switch is in the reset disconnected position when the power operated mechanism is in a home state.

7. The motor control system as set forth in claim 6, wherein the power operated mechanism is driven to the home state when the motor control circuit is in the second operation mode without assistance from a spring.

8. The motor control system as set forth in claim 2, further comprising an electronic control unit coupled to the motor control circuit and configured to control the power release motor by commanding the motor control circuit to provide at least one of a first motor current flow and a first motor voltage in the first operation mode to drive the power release motor in the first direction to actuate the power release gear in a releasing direction, and at least one of a second motor current flow and a second motor voltage in the second operation mode to drive the power release motor in the second direction to actuate the power release gear in a resetting direction, wherein the speed of the power release motor when driven in the second operation mode is lower than the speed of the power release motor when driven in the first operation mode.

9. The motor control system as set forth in claim 8, wherein the first operation mode is one of a power release mode and a release mode and the second operation mode is one of a reset mode and an unlock mode and the motor control circuit includes a plurality of relays coupled between one of the first motor terminal and the second motor terminal and one of the voltage supply and the electrical ground to provide one of the first motor current flow and the second motor current flow, wherein the first motor current flow is from the voltage supply to the first motor terminal and through the second motor terminal to the electrical ground to drive the power release motor in the first direction and the second motor current flow is from the voltage supply to the second motor terminal through the first motor terminal to the electrical ground to drive the power release motor in the second direction being opposite the first direction and wherein the electronic control unit is coupled to the plurality of relays and configured to control the power release motor by commanding the plurality of relays to provide the first motor current flow in one of the power release mode and the release mode and the second motor current flow in one of the reset mode and the unlock mode.

10. The motor control system as set forth in claim 9, wherein the plurality of relays includes:

a release relay having a release coil including a release coil positive terminal coupled to the voltage supply and a release coil negative terminal coupled to a release drive node coupled to the electronic control unit and the release relay including a common release contact coupled to the first motor terminal and a first release contact coupled to the voltage supply and a second release contact coupled to the electrical ground and a release armature being rotatably and electrically coupled the common release contact and being movable between engaging the first release contact and the second release contact in response to a release coil current flow through the release coil to provide a selectable release current flow from the voltage supply to the first motor terminal of the power release motor and from the first motor terminal of the power release motor to the electrical ground based on one of the release drive node being electrically grounded and the release drive node not being grounded;

an unlock relay having an unlock coil including an unlock coil positive terminal coupled to the voltage supply and an unlock coil negative terminal coupled to an unlock drive node coupled to the electronic control unit and the unlock relay including a common unlock contact coupled to the second motor terminal and a first unlock contact coupled to a branch node and a second unlock contact and an unlock armature being rotatably and electrically coupled the common unlock contact and being movable between engaging the first unlock contact and the second unlock contact in response to an unlock coil current flow through the unlock coil to provide a selectable unlock current flow between the branch node and the second motor terminal of the power release motor based on one of the unlock drive node being electrically grounded and the unlock drive node not being grounded;

a reset relay having a reset coil including a reset coil positive terminal coupled to the voltage supply and a reset coil negative terminal coupled to a reset drive node coupled to the electronic control unit and the reset relay including a common reset contact coupled to the second motor terminal and a first reset contact coupled to the branch node and a second reset contact and a reset armature being rotatably and electrically coupled the common reset contact and being movable between engaging the first reset contact and the second reset contact in response to a reset coil current flow through the release coil to provide a selectable reset current flow between the branch node and the second motor terminal of the power release motor based on one of the reset drive node being electrically grounded and the reset drive node not being grounded; and a power control relay having a power control coil including a power control coil positive terminal coupled to the voltage supply and a power control coil negative terminal coupled to a power control node coupled to the electronic control unit and the power control relay including a common power control contact coupled to the branch node and a first power control contact coupled to the voltage supply and a second power control contact coupled to the electrical ground and a power control armature being rotatably and electrically coupled to the common power control contact and being movable between engaging the first power control contact and the second power control contact in response to a power control coil current flow through the power control coil to provide a selectable power control current flow between the voltage supply to the branch node and between the branch node and the electrical ground based on one of the power control node being electrically grounded and the power control node not being grounded.

11. The motor control system as set forth in claim 10, further including:
a reset switch coupled to the second motor terminal and movable between a reset connected position for connecting the power release motor to the common reset contact of the reset relay and a reset disconnected position for disconnecting the power release motor from the common reset contact of the reset relay; and
a reset resistor connected in series between the reset switch and the reset relay for reducing the selectable reset current flow between the branch node and the second motor terminal and through the reset switch.

12. The motor control system as set forth in claim 1, wherein the motor control circuit is configured to cease providing the power supply to the motor when the closure latch assembly is in a reset position.

13. A closure latch system for a vehicle door, comprising:
a closure latch assembly including a latch mechanism including a ratchet and a pawl, the ratchet being moveable between a striker release position and a striker capture position, the pawl being moveable between a ratchet holding position whereat the pawl holds the ratchet in its striker capture position and a ratchet releasing position whereat the pawl permits the ratchet to move to its striker release position;
the closure latch assembly including a latch release mechanism including a latch release lever moveable between a home position whereat the pawl is maintained in its ratchet holding position and a pawl release position whereat the latch release lever moves the pawl to its ratchet releasing position;
the closure latch assembly including a power release mechanism including a power release motor, a power release gear driven by the power release motor, and an actuator lever, the actuator lever being moveable between a non-actuated position whereat the latch release lever is maintained in its home position and an actuated position whereat the actuator lever moves the latch release lever to its pawl release position, the power release gear being rotatable in a releasing direction from a central-home position to a released position for causing the actuator lever to move from its non-actuated position into its actuated position, and the power release gear being rotatable in an unlocking direction from its central-home position to an unlocked position;
a motor control system including a motor control circuit coupled between one of a first motor terminal and a second motor terminal of the power release motor and one of a voltage supply and an electrical ground to control a current supply to the power release motor and move the power release gear between its unlocked position and its central-home position and its released position; and
the motor control system including an electronic control unit coupled to the motor control circuit and configured to control the power release motor by commanding motor control circuit to provide a first motor current flow in a first operation mode to drive the power release motor in a first direction and a second motor current flow in a second operation mode to drive the power release motor in a second direction, wherein a speed of the power release motor when driven in the first operation mode is different than the speed of the power release motor when driven in the second operation mode and the power release mechanism is driven without assistance from a spring when the electronic control unit is in the second operation mode to reset the closure latch assembly.

14. The closure latch system as set forth in claim 13 wherein the motor control circuit includes a plurality of switching units coupled between one of the first motor terminal and the second motor terminal and one of the voltage supply and the electrical ground to provide the first motor current flow from the voltage supply to the first motor terminal through the second motor terminal to the electrical ground to drive the power release motor in the first direction and provide the second motor current flow from the voltage supply to the second motor terminal through the first motor terminal to the electrical ground to drive the power release motor in the second direction.

15. The closure latch system as set forth in claim 14, wherein the plurality of switching units includes a plurality of relays comprising:
   a release relay coupled to the voltage supply and the electrical ground and to the first motor terminal of the power release motor to provide a selectable release current flow from the voltage supply to the first motor terminal and from the first motor terminal to the electrical ground;
   an unlock relay coupled to the voltage supply and to a branch node and to the second motor terminal of the power release motor to provide a selectable unlock current flow between the branch node and the second motor terminal and from the second motor terminal to the branch node;
   a reset relay coupled to the voltage supply and to the branch node and to the second motor terminal of the power release motor to provide a selectable reset current flow between the second motor terminal and the branch node; and
   a power control relay coupled to the voltage supply and the electrical ground and to the branch node to provide a selectable power control current flow from the voltage supply to the branch node and from the branch node to the electrical ground.

16. A method of controlling a power release motor of a power release mechanism of a closure latch assembly, comprising the steps of:
   configuring a motor control circuit in a first operation mode to supply at least one of a first motor current flow and a first motor voltage to drive the power release motor in a first direction through a first electrical circuit path established between one of a first motor terminal of the power release motor and a second motor terminal of the power release motor and one of a voltage supply and an electrical ground;
   supplying the power release motor with the at least one of the first motor current flow and the first motor voltage to drive the power release motor with a first speed in the first operation mode;
   configuring the motor control circuit in a second operation mode to supply at least one of a second motor current flow and a second motor voltage to drive the power release motor in a second direction through a second electrical circuit path established between one of the first motor terminal and the second motor terminal and one of the voltage supply and the electrical ground, wherein the second electrical circuit path has an electrical resistance greater than the electrical resistance of the first electrical circuit path such that the second motor current flow is less than the first motor current flow; and
   supplying the power release motor with the at least one of the second motor current flow and the second motor voltage to drive the power release motor with a second speed different than the first speed in the second operation mode, wherein the power release motor is driven without assistance from a spring in the second operation mode to reset the closure latch assembly.

17. The method as set forth in claim 16, further including the steps of:
   interrupting the second electrical circuit path for preventing the second motor current flow through the second electrical circuit path when driving the power release motor in the second direction in response to detecting the power release mechanism in a home state.

18. The method as set forth in claim 16, further including the steps of:
   determining whether the power release motor should move in one of a first direction and a second direction opposite the first direction using an electronic control unit;
   commanding a plurality of relays coupled to the electronic control unit and between one of a first motor terminal and a second motor terminal and one of a voltage supply and an electrical ground in response to determining that the power release motor should move in the first direction using the electronic control unit in a power release mode;
   providing the first motor current flow from the voltage supply to the first motor terminal of the power release motor through the second motor terminal to the electrical ground using the plurality of relays;
   driving the power release motor in the first direction with the first motor current flow;
   commanding the plurality of relays in response to determining that the power release motor should move in the second direction using the electronic control unit in a reset mode;
   providing the second motor current flow from the voltage supply to the second motor terminal through the first motor terminal to the electrical ground using the plurality of relays; and
   driving the power release motor in a second direction with the second motor current flow.

* * * * *